United States Patent [19]

Schneider

[11] Patent Number: 4,688,166

[45] Date of Patent: Aug. 18, 1987

[54] DIRECT MEMORY ACCESS CONTROLLER SUPPORTING MULTIPLE INPUT/OUTPUT CONTROLLERS AND MEMORY UNITS

[75] Inventor: Glenn H. Schneider, Phoenix, Ariz.

[73] Assignee: Motorola Computer Systems, Inc., Cupertino, Calif.

[21] Appl. No.: 637,447

[22] Filed: Aug. 3, 1984

[51] Int. Cl.⁴ .............................................. G06F 13/28
[52] U.S. Cl. ..................................................... 364/200
[58] Field of Search ... 364/200 MS File, 900 MS File, 364/200, 900

[56] References Cited

U.S. PATENT DOCUMENTS

| | | | |
|---|---|---|---|
| 4,067,059 | 1/1978 | Derchak | 364/200 |
| 4,245,305 | 1/1981 | Gechele | 364/200 |
| 4,400,772 | 8/1983 | Broyles et al. | 364/200 |
| 4,403,282 | 9/1983 | Holberger et al. | 364/200 |
| 4,455,620 | 6/1984 | Watanable et al. | 364/900 |
| 4,481,572 | 11/1984 | Ochsner | 364/200 |
| 4,481,578 | 11/1984 | Hughes et al. | 364/200 |
| 4,514,808 | 4/1985 | Murayama et al. | 364/200 |
| 4,543,629 | 9/1985 | Carey et al. | 364/200 |
| 4,558,412 | 12/1985 | Inoshita | 364/200 |

Primary Examiner—Archie E. Williams, Jr.
Assistant Examiner—Emily Yue Chan
Attorney, Agent, or Firm—Walter W. Nielsen

[57] ABSTRACT

A direct memory access controller (8, FIG. 1) is provided which can service a number of input/output controllers (24, 26) concurrently on a time-division multiplexed basis. The direct memory access controller 8 (DMAC) is capable of interconnecting more than one input/output device (64, 66, 69, 74, 76) with more than one system memory (2, 20). The DMAC 8 can also transfer data from one system memory (2) to a second system memory (20), or within one system memory.

1 Claim, 34 Drawing Figures

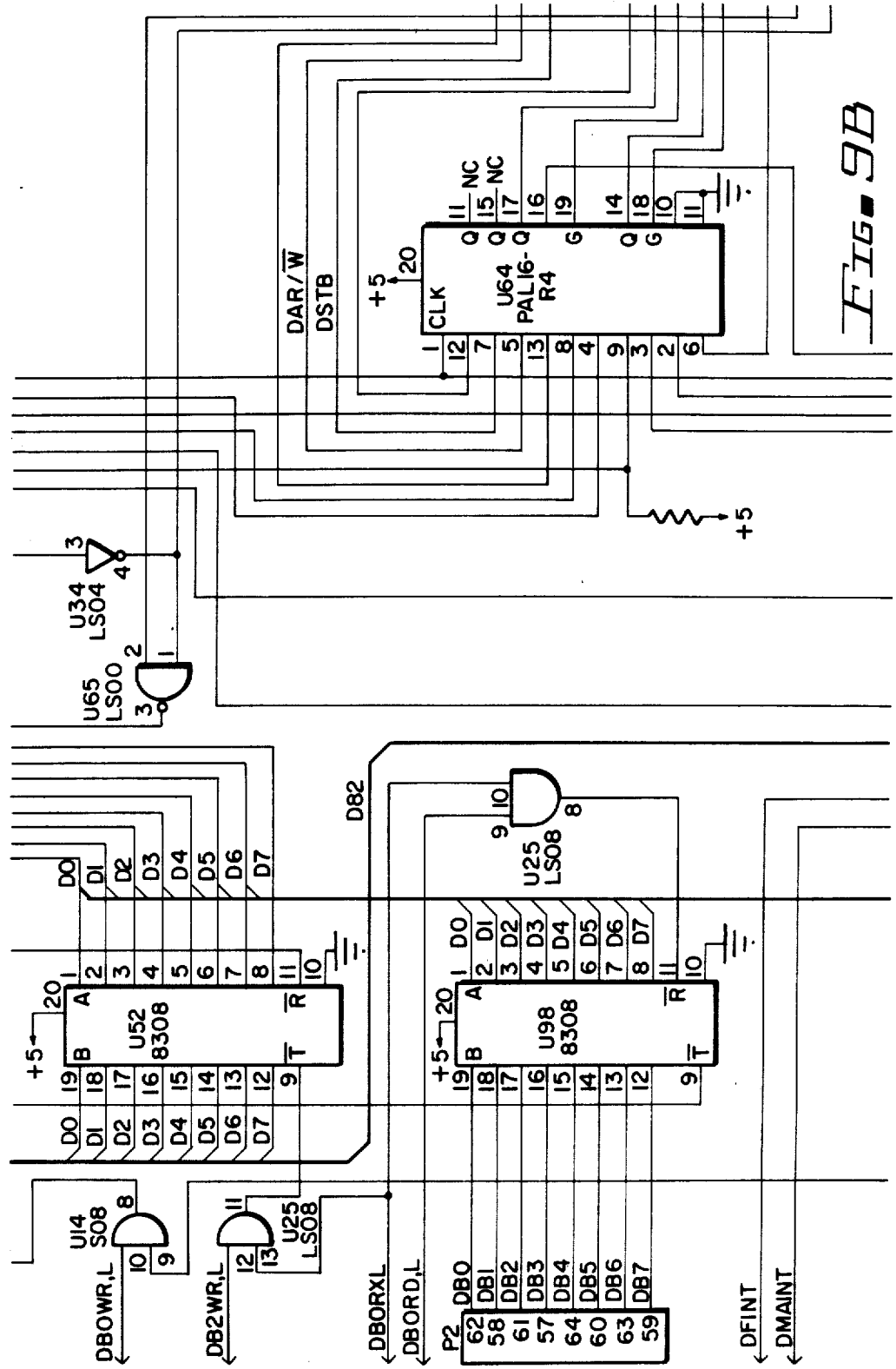

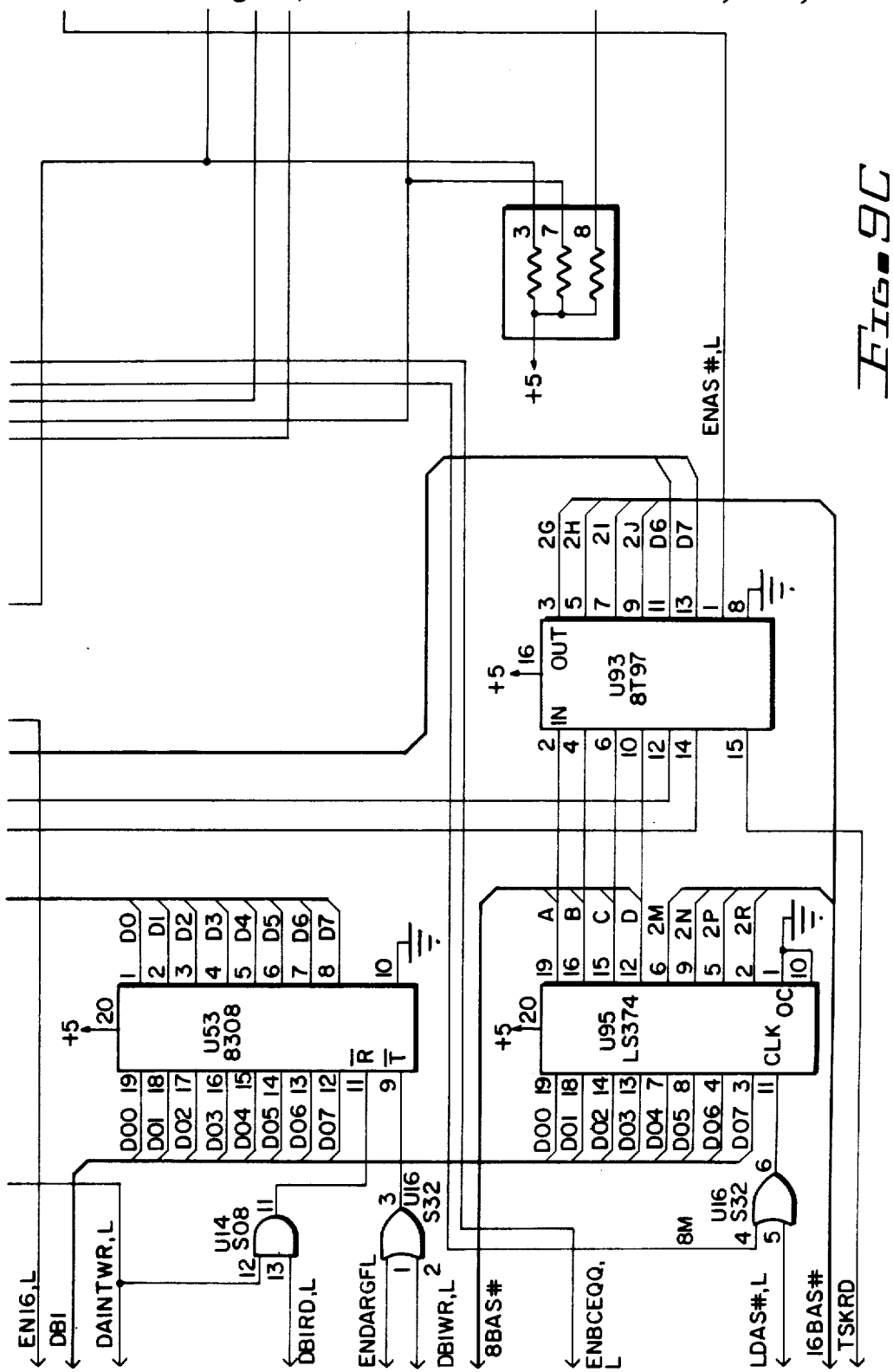

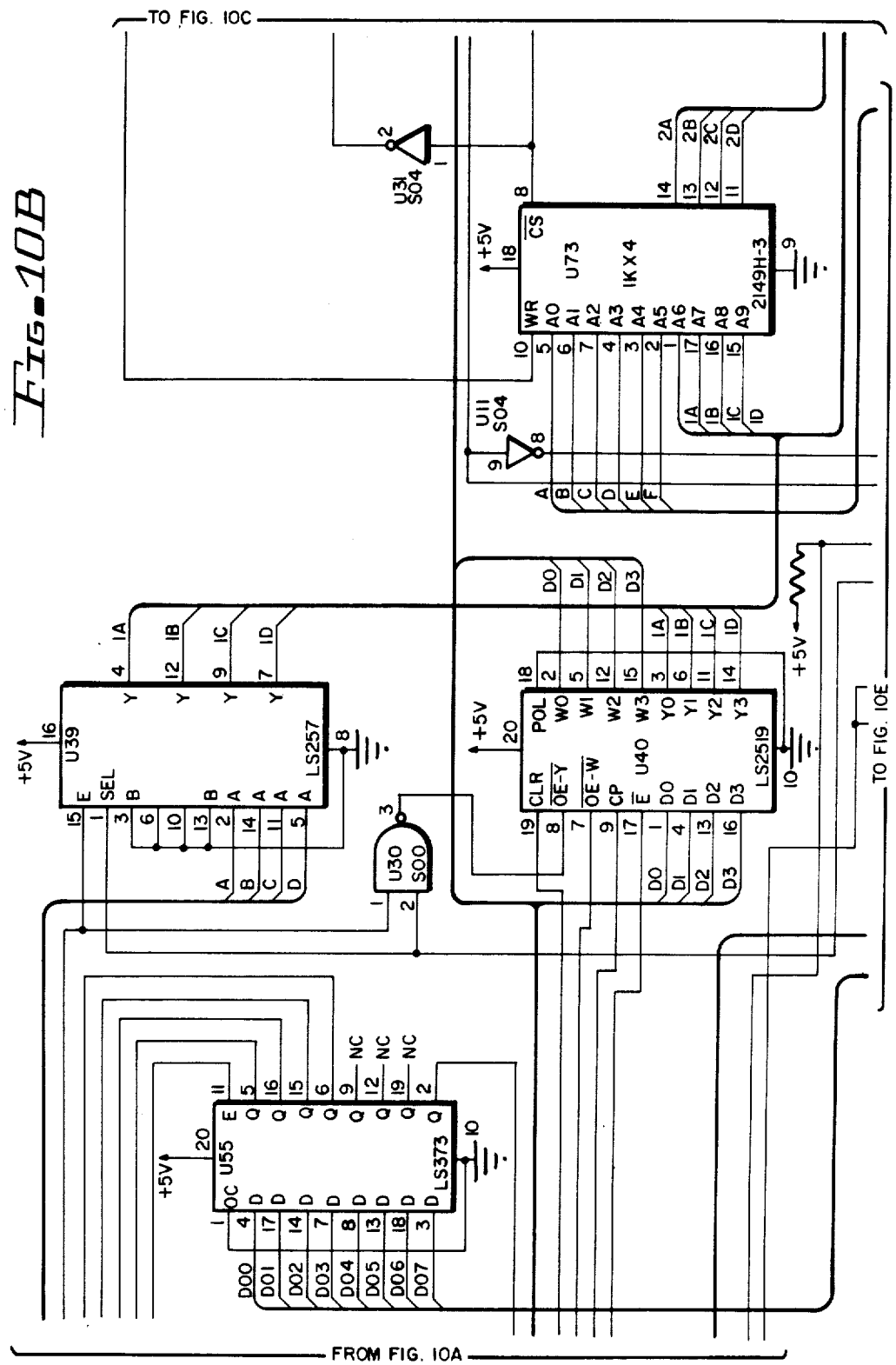

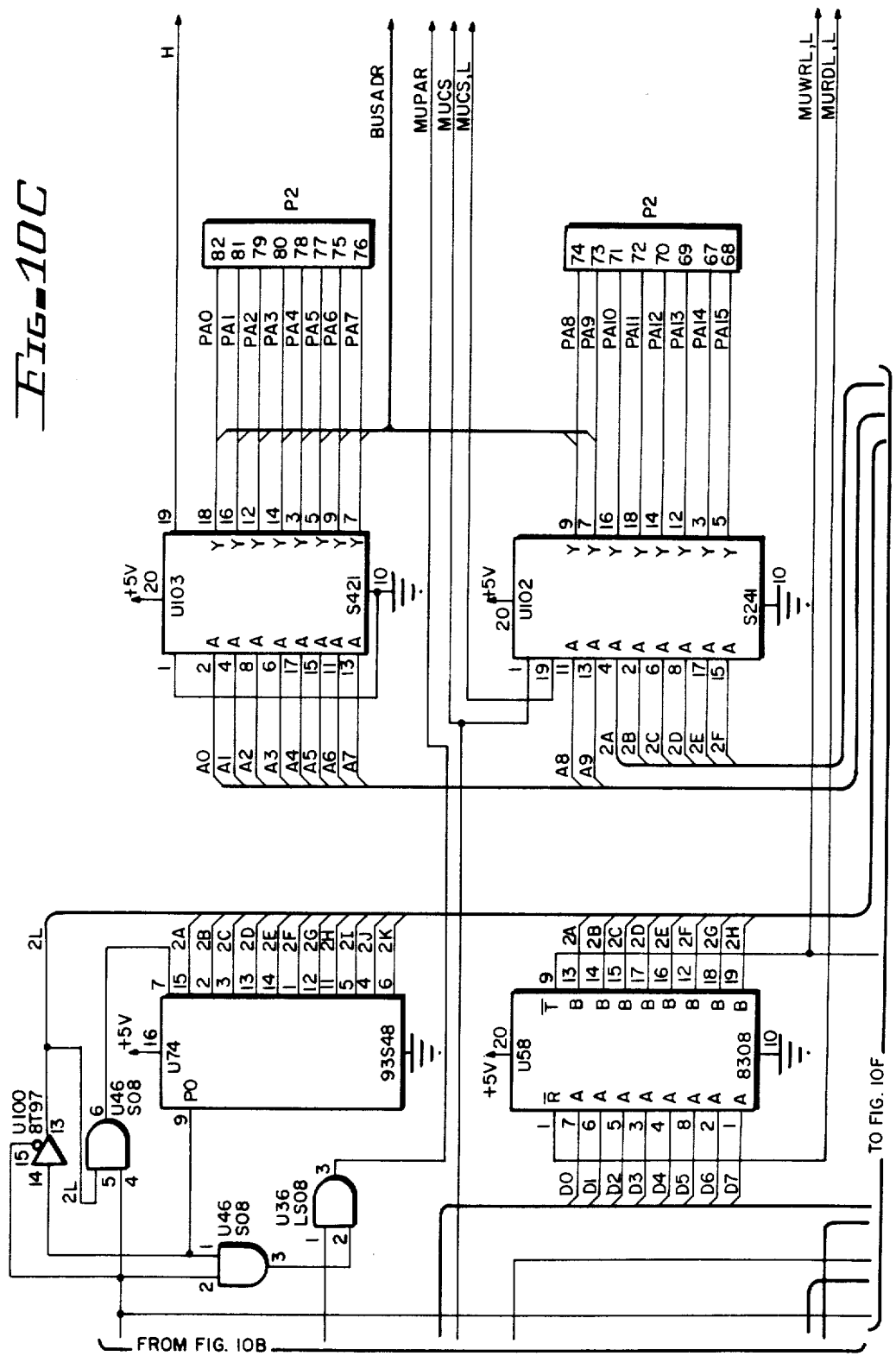

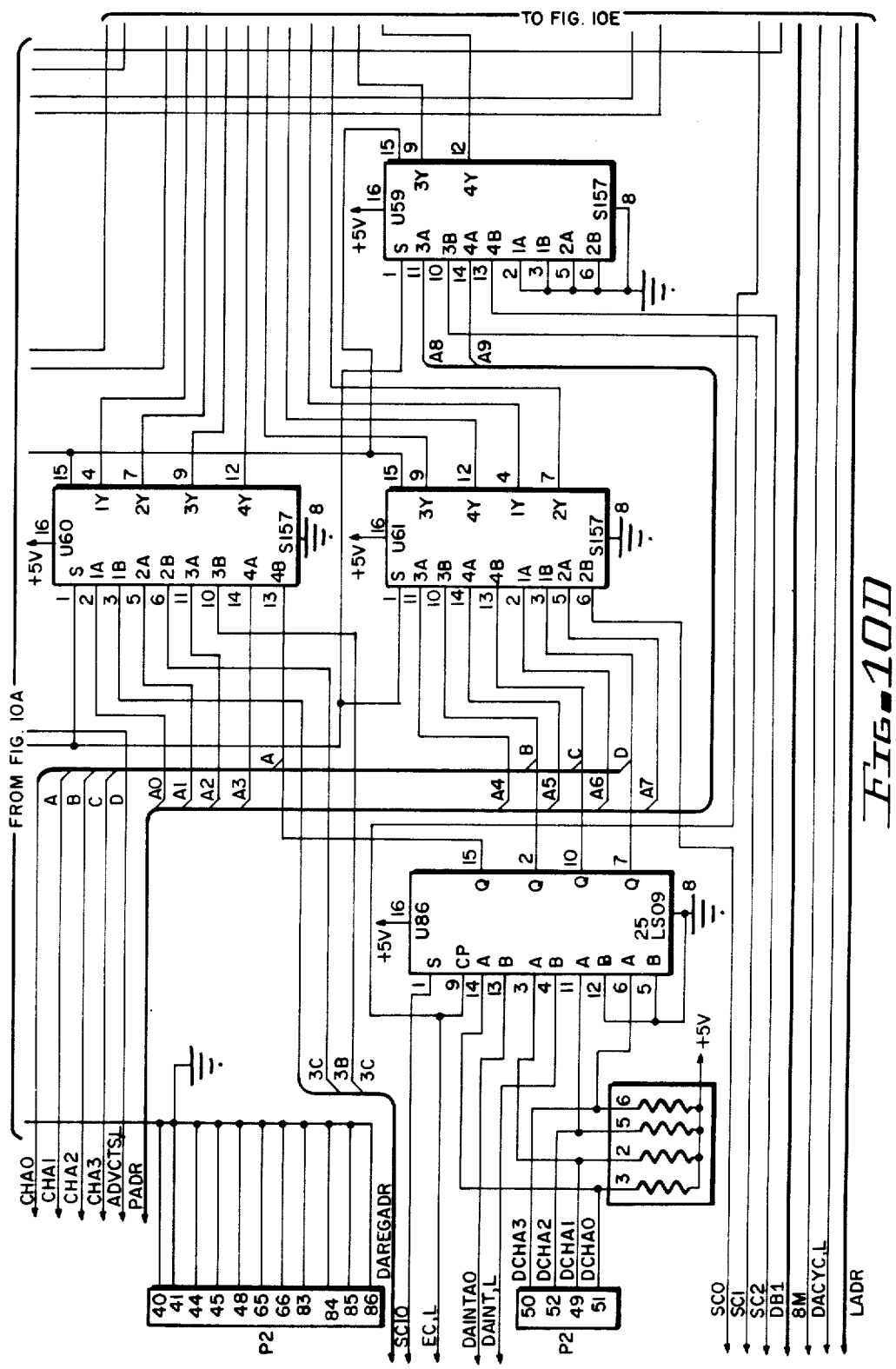

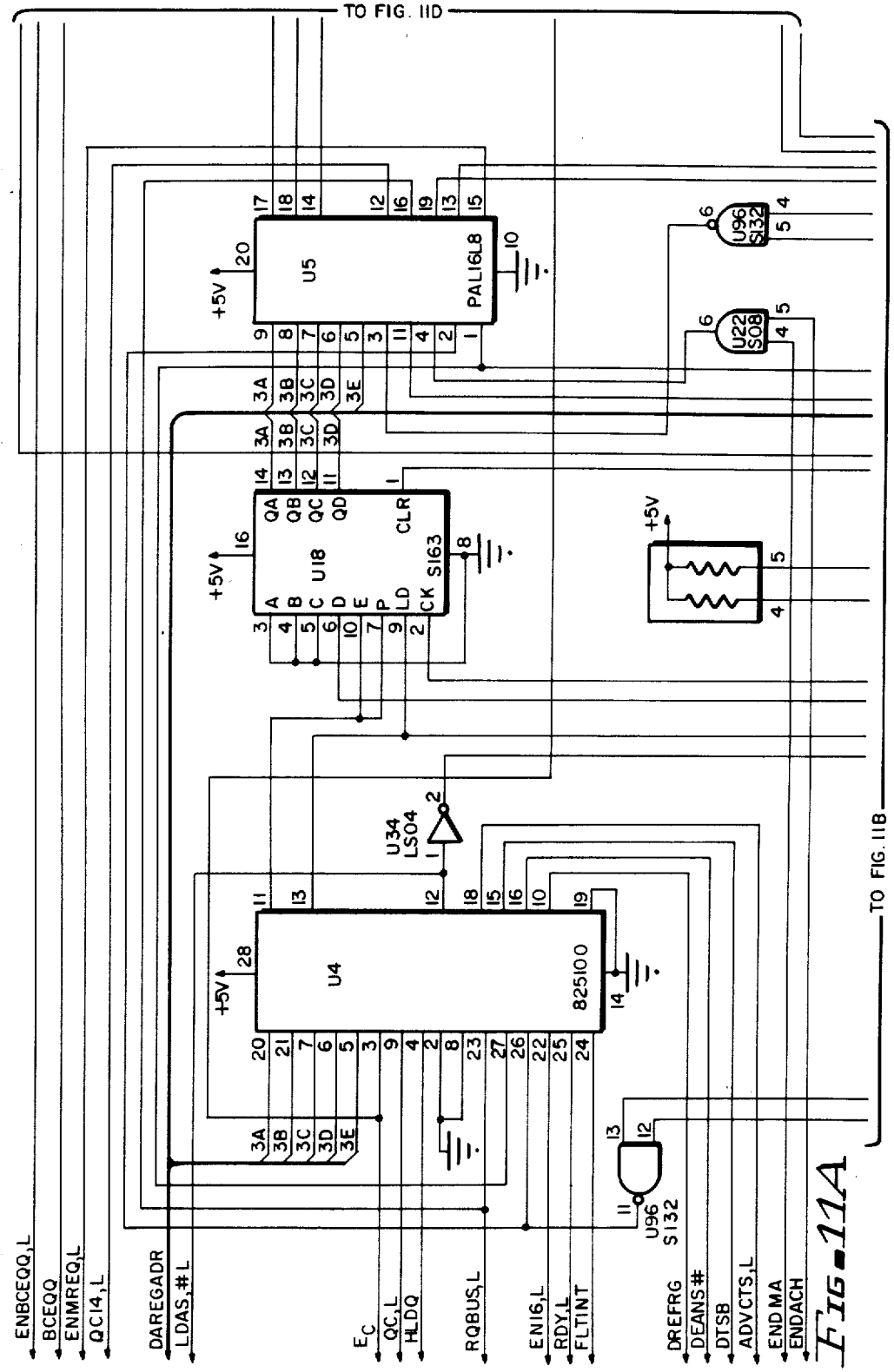

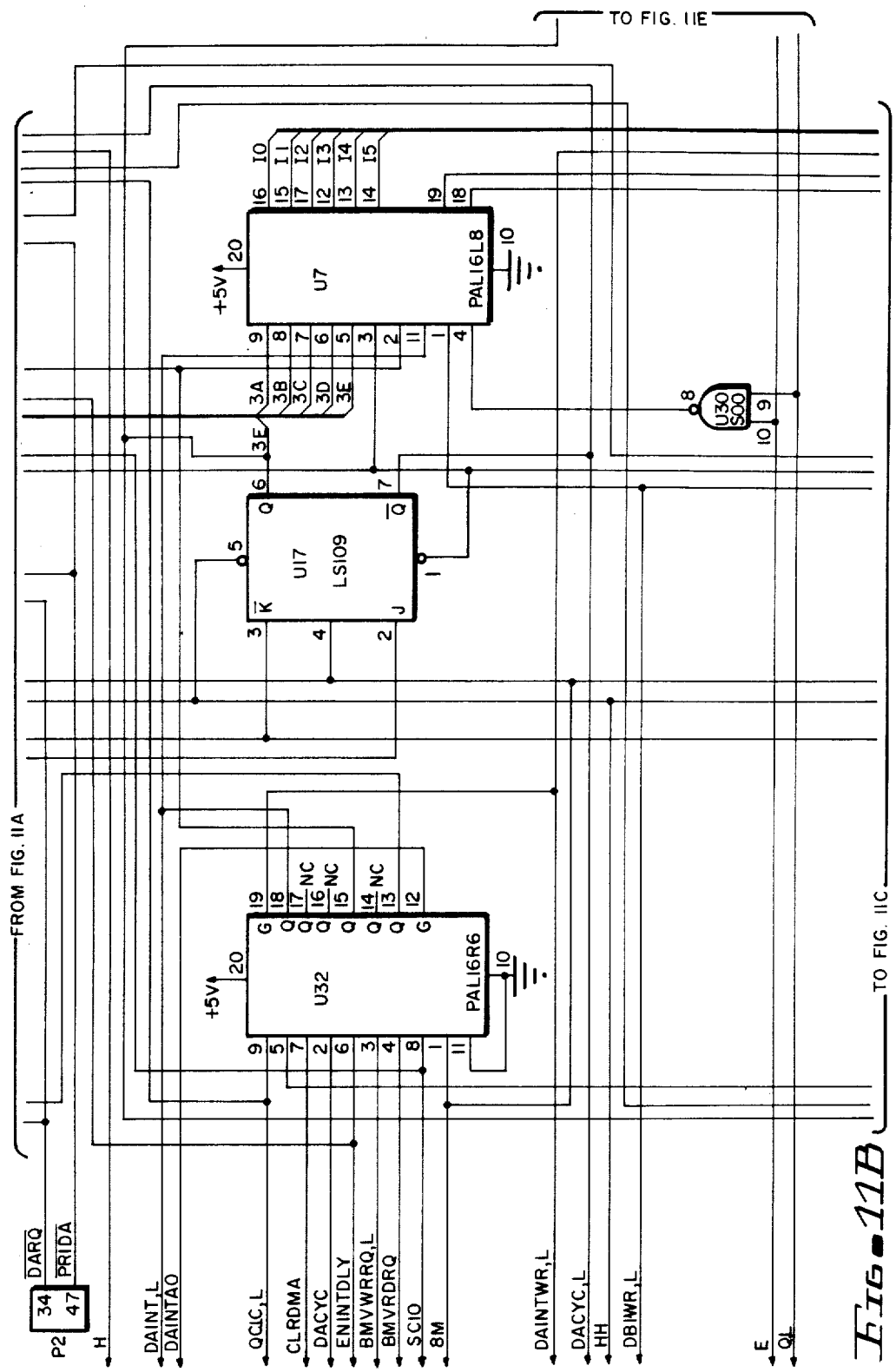

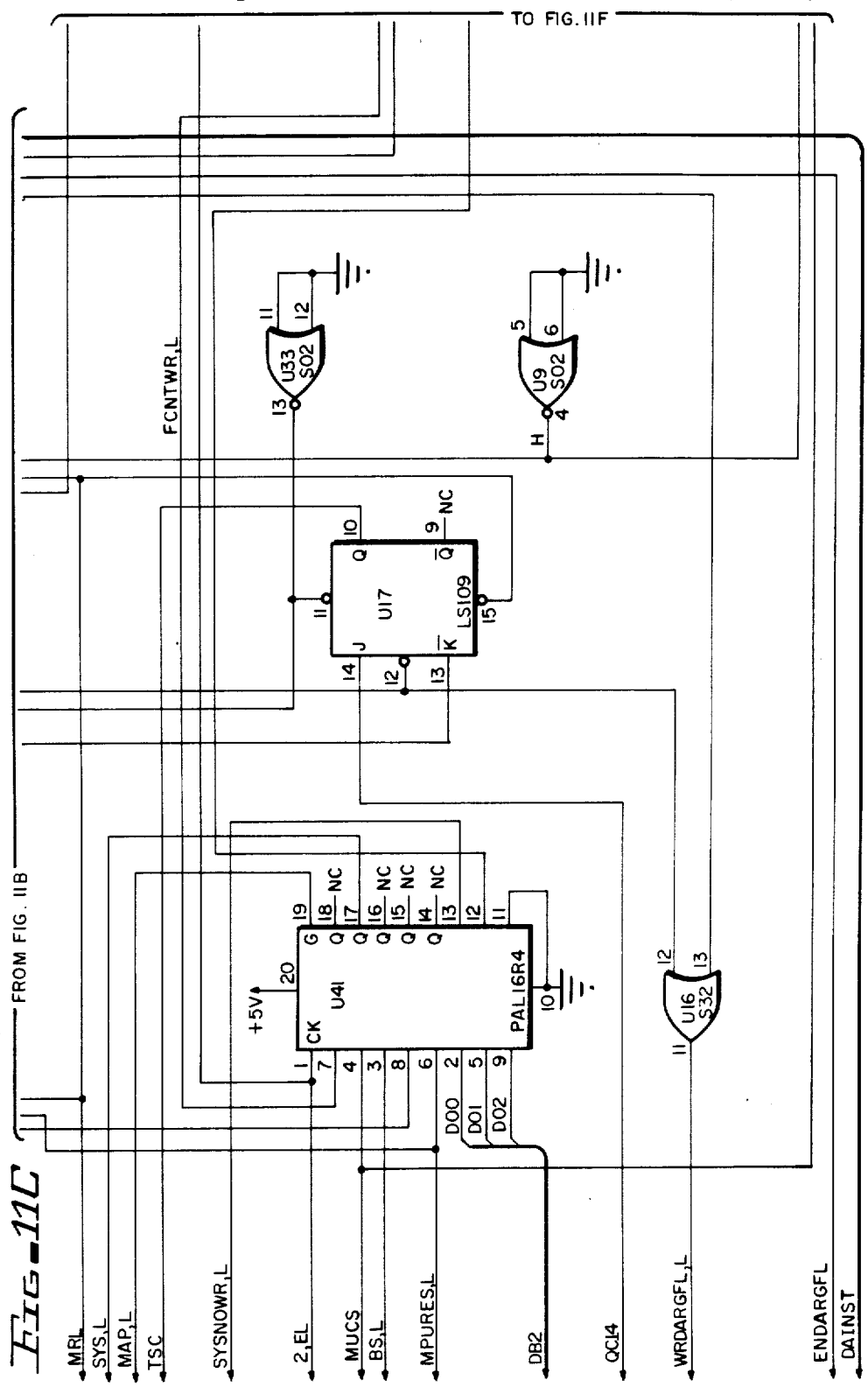

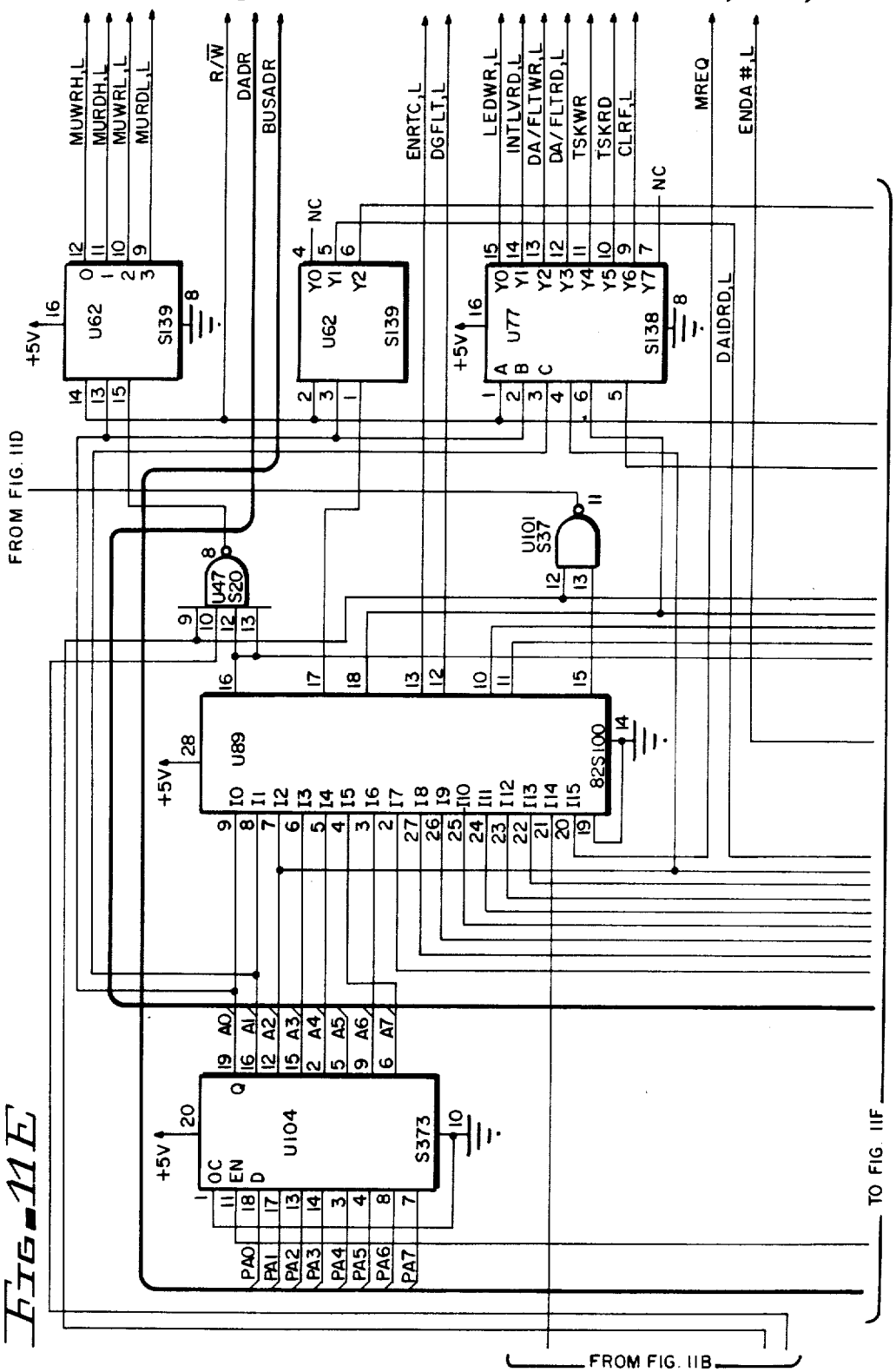

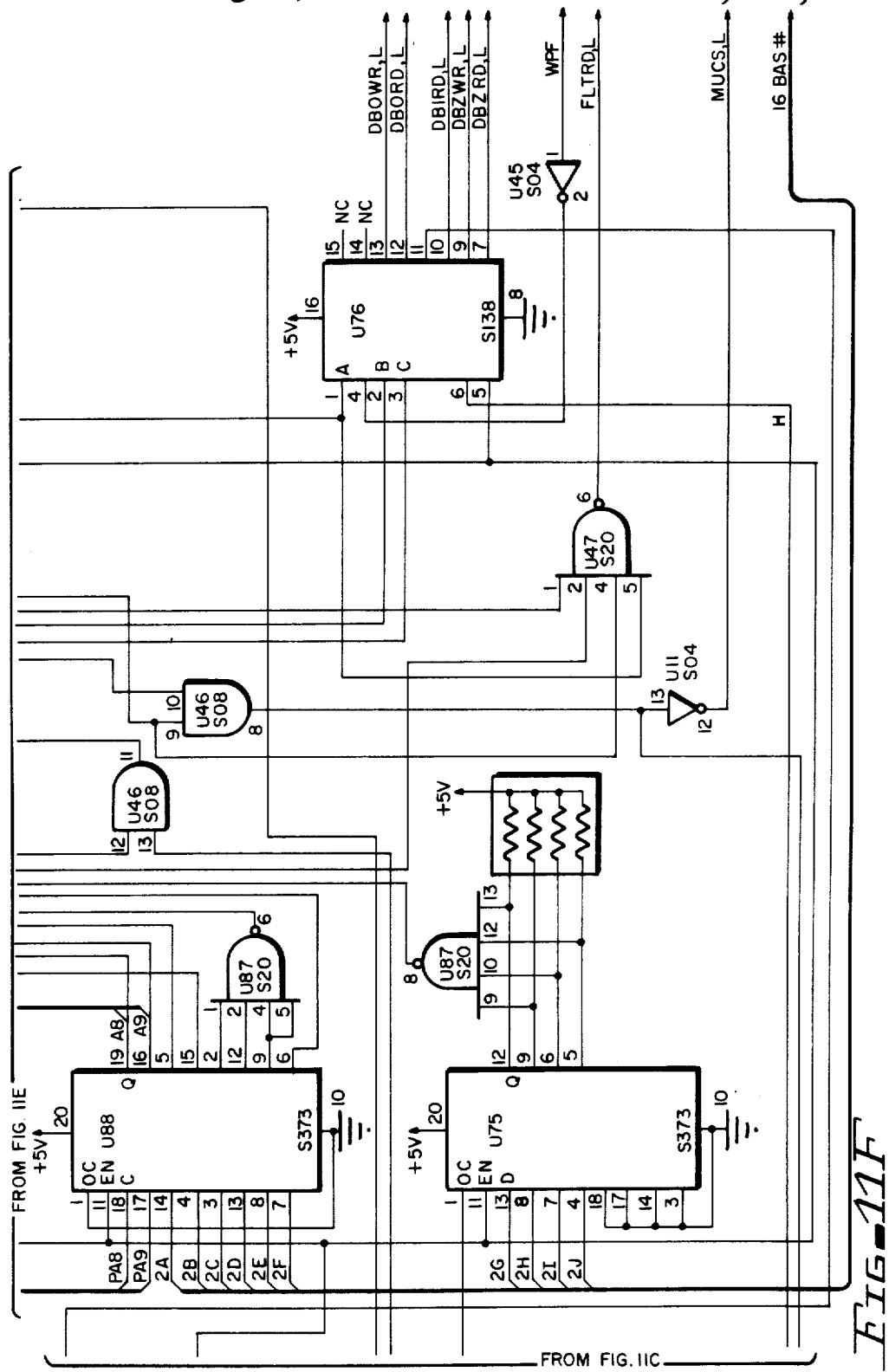

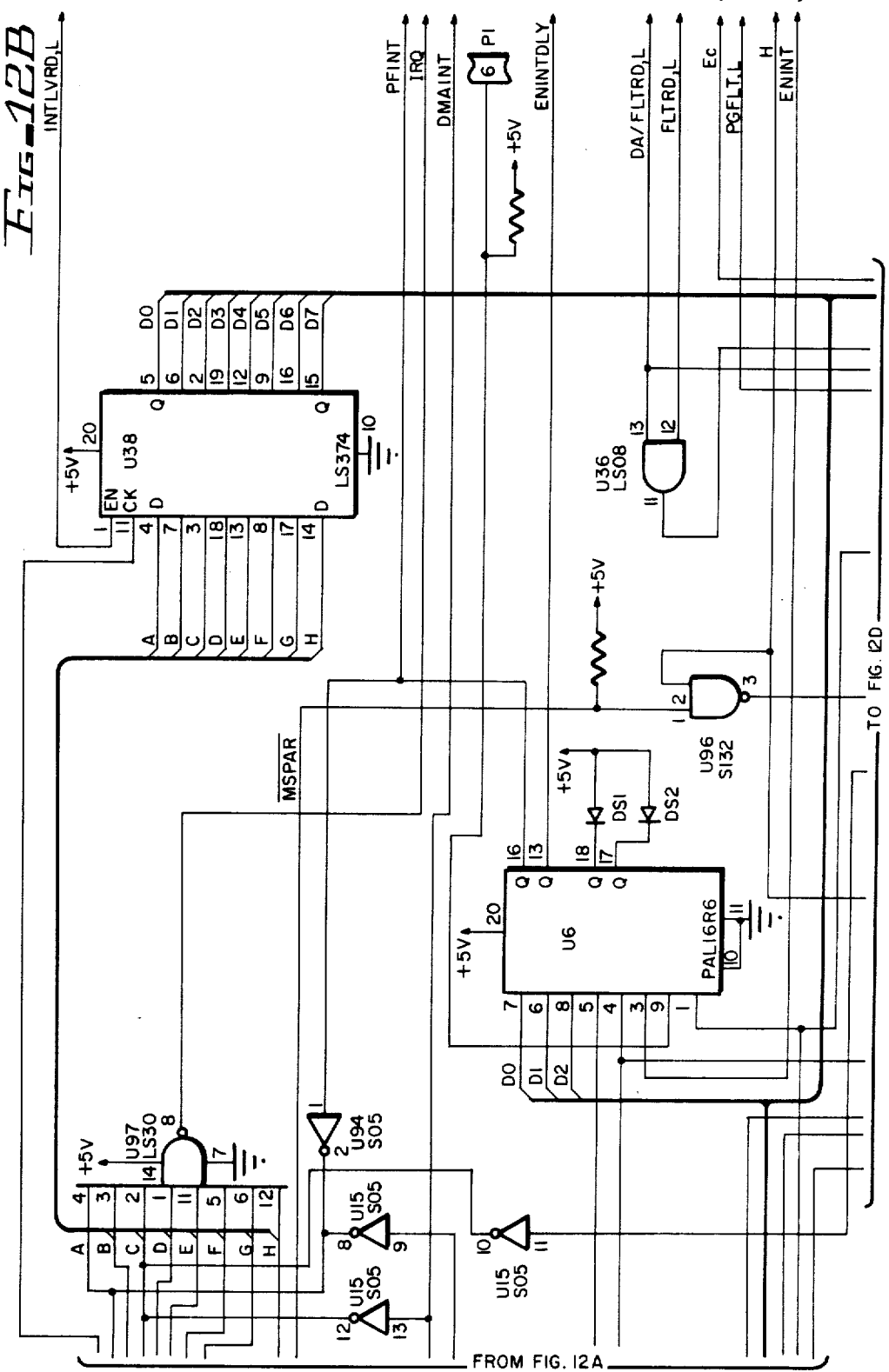

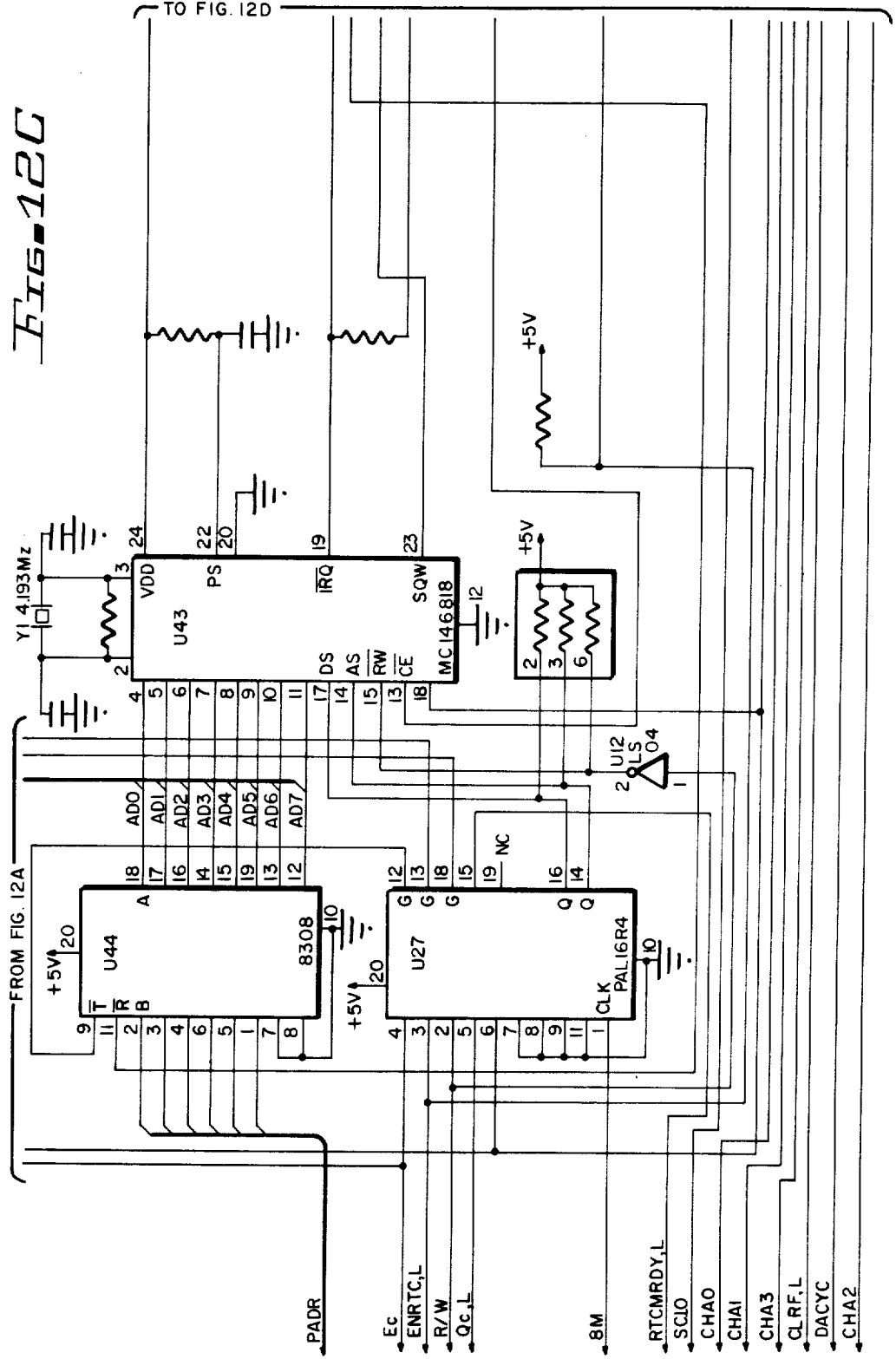

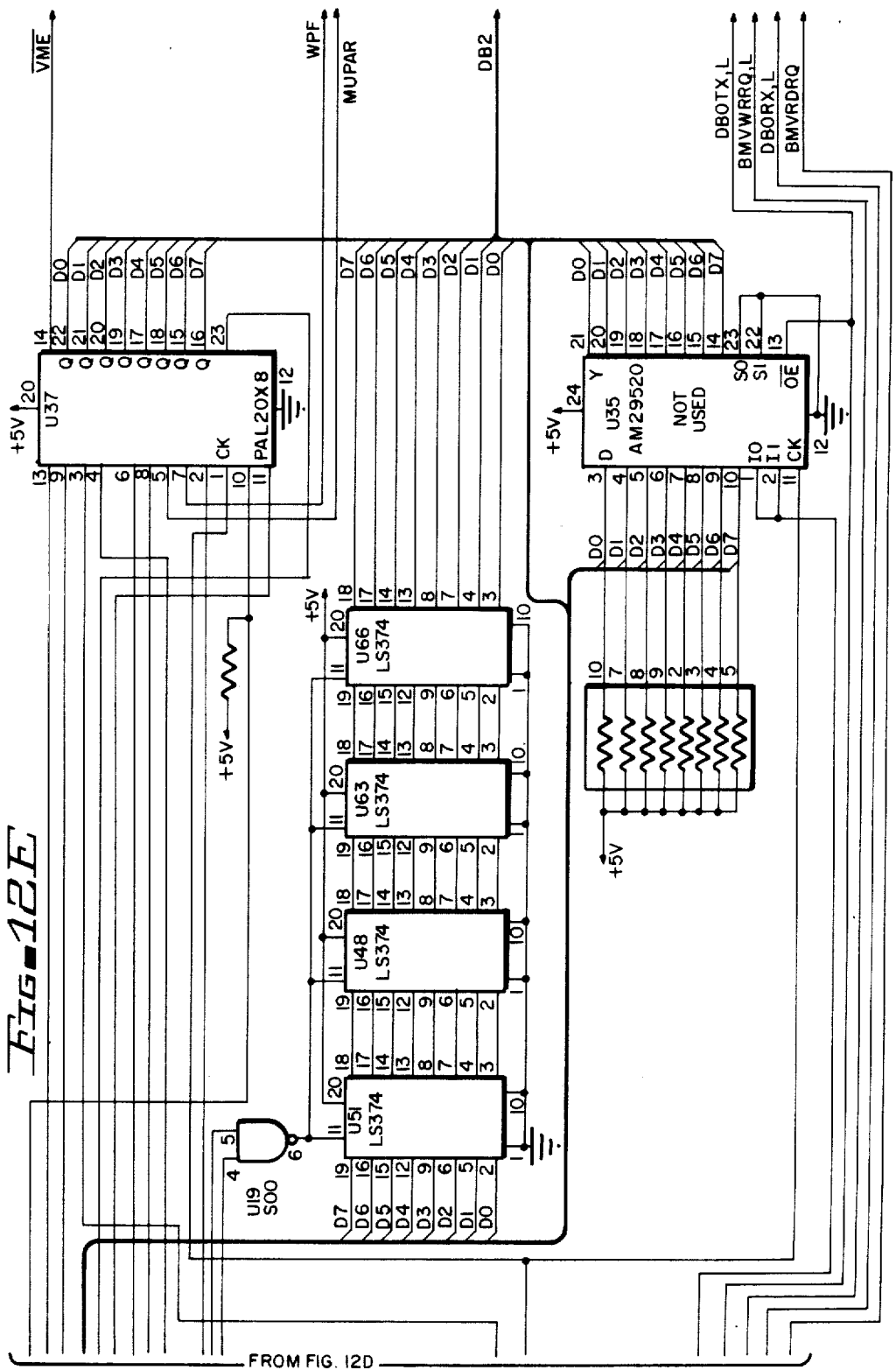

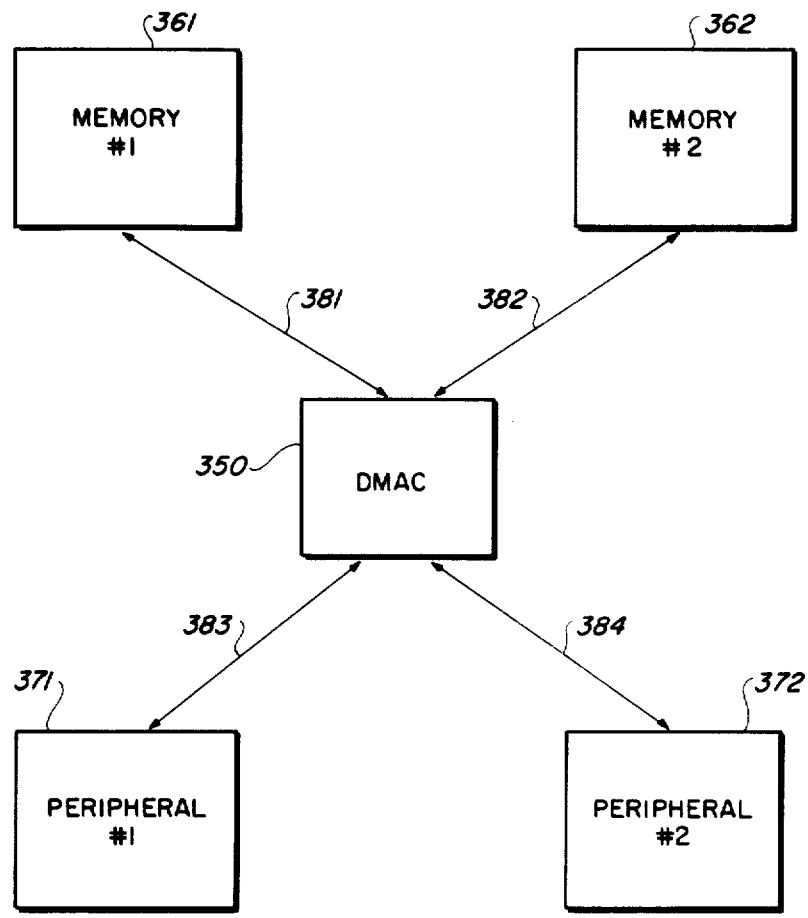
_FIG. 13_

DIRECT MEMORY ACCESS CONTROLLER SUPPORTING MULTIPLE INPUT/OUTPUT CONTROLLERS AND MEMORY UNITS

CROSS-REFERENCES TO RELATED APPLICATIONS

Memory Management Unit With High Speed Translation, invented by Frank DeSanna, U.S. Ser. No. 637,446, filed on even date herewith, and assigned to the assignee of the present invention.

BACKGROUND OF THE INVENTION

1. Field of the Invention

This invention relates generally to the area of digital data processing equipment, and, in particular, to a direct memory access controller.

2. Description of the Related Art

In a digital data processing system, the central processing unit (CPU) generally operates at a very fast cycle rate in comparison to the data transfer rate of the input/output device of the system. Such input/output devices have frequent need to transfer data to and from a memory unit in the system. The CPU also needs to access such memory unit. To preserve the integrity of the information stored in the memory unit, such information cannot be accessed simultaneously by the CPU and the input/output devices.

Systems are known in which the CPU itself services all transfers between the input/output devices and the memory unit. However, in systems with many input/output devices demanding I/O services, the CPU performance is degraded.

Systems are also known in which the technique referred to as direct memory access (DMA) is employed. Using direct memory access, information can be directly transferred between the input/output devices and the memory unit with only minimal involvement by the CPU. Typically, an input/output device makes an I/O request to a corresponding input/output controller, which request is honored if it is of sufficient priority. Then that input/output device controls the system bus until the DMA transfer has been completed or until a higher priority request is made by another input/output device.

Some prior DMA systems provided only a single DMA register set for use by a large number of input/output devices, which register set had to be loaded for each DMA transfer. In other DMA systems, each input/output controller has its own set of DMA address, count, and control registers, which is expensive to implement.

The present invention represents an improvement over known DMA systems in that it provides for interleaved DMA operations of a number of I/O controllers. This is accomplished through the use of short bursts of DMA activity by each I/O controller. Between bursts, the I/O controllers are polled in a round robin manner to determine if any of them have active DMA requests. Thus all I/O controllers share the system bus in a time-division multiplexed fashion which provides sufficient bandwidth to each I/O controller to keep up with its real-time demands.

A number of DMA channels are assigned to each I/O controller. Each DMA channel has its own set of DMA registers, so that an I/O operation can be in progress on each input/output device in the system concurrently. The operating system software sets up a DMA channel when an I/O device initiates a request, but the system software then remains uninvolved until the I/O device requires termination of the I/O interrupt request.

Known data processing systems utilize more than one memory unit. The data processing system of the present invention provides one memory unit for the central processing unit (CPU) for storing data and instructions relating to operating system software and applications software, and a second memory unit for an I/O processor, referred to as the Master Input Output Processor (MIOP), for storing data and instructions relating to transfers of information between input/output devices and the system.

The present invention also utilizes two system busses. One services the CPU and the other services the MIOP. The present invention represents a further improvement over known multi-processor data processing systems, in that it allows for DMA bi-directional transfers between any input/output device and either system memory unit. It also provides for DMA bi-directional transfers between the system memory units, as well as for block moves within either system memory unit.

SUMMARY OF INVENTION

Accordingly, it is an object of the present invention to provide a Direct Memory Access Controller Supporting Multiple Input/Output Controllers and Memory Units.

It is another object of the present invention to provide a direct memory access controller which can service a number of input/output controllers concurrently on a time-division multiplexed basis.

It is also an object of the present invention to provide a direct memory access controller which is capable of interconnecting more than one input/output device with more than one system memory (i.e. target memory).

It is a further object of the present invention to provide a direct memory access controller which is capable of transferring data from one system memory to a second system memory, or within one system memory.

It is another object of the present invention to provide a direct memory access controller which takes advantage of peripheral intelligence by allowing it to determine which of several open (i.e. pending) peripheral commands will be executed next.

It is yet a further object of the present invention to provide a direct memory access controller which provides an interrupt queuing mechanism whereby it uses its DMA capability to store its DMA completion information.

These and other objects are achieved in accordance with a preferred embodiment of the invention by providing in a data processing system comprising a central processing unit, at least two memory units each storing instructions and data for processing by the central processing unit, and at least one peripheral unit requiring access to each of the memory units, the improvement wherein the data processing system further comprises a direct access memory controller coupled between the peripheral unit and the memory units, the memory controller enabling the peripheral unit to access either of the memory units without interrupting the operation of the processing unit.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 9A–9E, 10A–10F, 11A–11F, and 12A–12E together form a detailed circuit diagram of the Master Input/Output Processor board, including the Direct Memory Access Controller Supporting Multiple Input/Output Controllers and Memory Units, of the data processing system shown in FIG. 1.

FIG. 13 shows a block diagram illustrating the flow of information between memories and peripherals through the Direct Memory Access Controller Supporting Multiple Input/Output Controllers and Memory Units of the present invention.

DESCRIPTION OF THE PREFERRED EMBODIMENT

Figure 1:
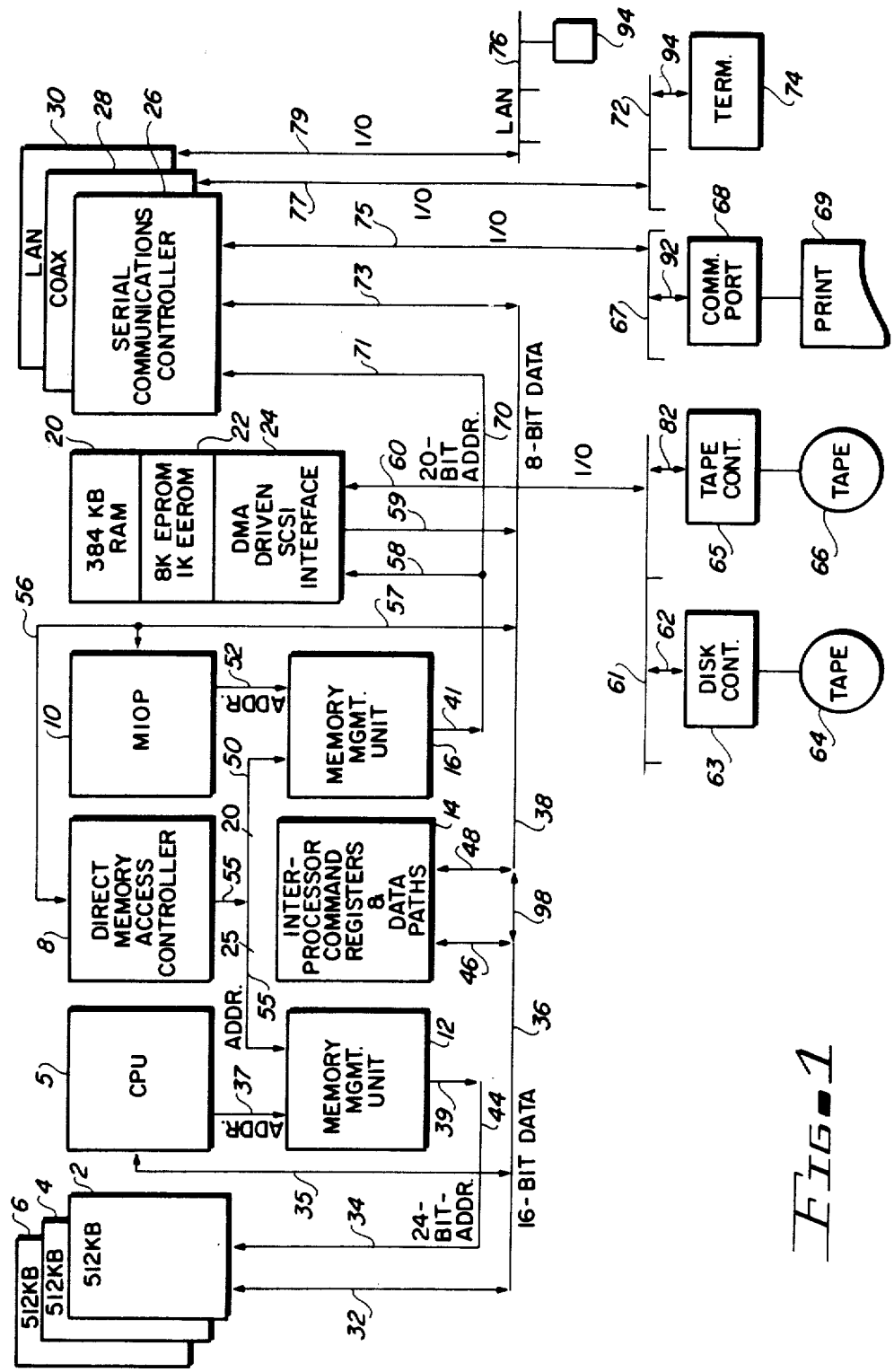
FIG. 1 shows a block diagram illustrating a preferred embodiment of a data processing system incorporating the Direct Memory Access Controller Supporting Multiple Input/Output Controllers and Memory of the present invention.

Referring now to FIG. 1, a block diagram of a digital data processing system employing a preferred embodiment of the Direct Memory Access Controller Supporting Multiple Input/Output Controllers and Memory Units of the present invention is shown. The system comprises three 512K blocks of main memory 2, 4, and 6, which are coupled via bus 32 to the system 16-bit data bus 36 and vis bus 34 to the system 24-bit address bus 44. A central processing unit (CPU) 5 is coupled via bus 35 to data bus 36 and via address bus 37 to memory management unit (MMU) 12. In the preferred embodiment CPU 5 is an MC68000 commercially available from Motorola, Inc. MMU 12 is also coupled to 25-bit address bus 55 and is coupled via bus 39 to address bus 44.

A more detailed description of MMU 12 may be found in the above-referrenced related invention.

Direct memory access controller (DMAC) 8 is coupled via bus 53 to 25-bit address bus 55 and to 20-bit address bus 50. DMAC 8 is also coupled to data bus 56.

A master input/output processor (MIOP) 10 is coupled to data bus 56 and to address bus 52. A second MMU 16 is also coupled to address bus 52, to address bus 50, and via bus 41 to 20-bit address bus 70.

Blocks 20, 22 and 24 are shown as one for ease of illustration. Block 20 represents a 384K RAM. Block 22 represents an 8K EPROM and 1K EEROM. And block 24 represents an industry standard small computer system interface (SCSI). Blocks 20, 22, and 24 are coupled via bus 58 to address bus 70, via bus 59 to 8-bit system data bus 38, and via I/O bus 60 to bus 61. To bus 61 are coupled various mass storage units and their respective controllers. For example, intelligent disk controller 63 is coupled to disk drive 64 and via bus 62 to bus 61. Tape controller 65 is coupled to tape drive 66 and vis bus 82 to bus 61.

Blocks 26, 28, and 30 are also shown as one for ease of illustration. Block 26 represents a serial communications controller. Block 28 represents a coaxial interface to user workstations, terminals, and other devices. And block 30 represents a local area network (LAN) interface to user devices. Blocks 26, 28, and 30 are coupled via bus 71 to address bus 70 and via bus 73 to data bus 38. The serial communications controller 26 is coupled via bus 75 to bus 67, to which are coupled various communications ports, for example, port 68 supporting printer 69. The coax interface 28 is coupled via bus 77 to bus 72, to which are coupled various user terminals or other devices, such as terminal 74. The LAN 30 is coupled via bus 79 to LAN bus 76, to which are coupled various user devices, such as device 94.

Block 14 represents various interprocessor command registers and data paths and is coupled via bus 46 to 16-bit data bus 36 and via bus 48 to 8-bit data bus 38. Tri-state bus 98 couples data bus 36 and data bus 38.

In FIG. 1, the CPU 5, MMU 12, and interprocessor command registers and data paths circuitry 14 are implemented on one printed circuit board, the detailed schematic of which is illustrated in the above-referenced invention. The DMAC 8, MIOP 10, ad MMU 16 are implemented on a different printed circuit board, the detailed schematic of which is shown in FIGS. 9–12 of the present invention. In FIG. 1, bus 35 represents data lines D00–D15 in the detailed schematics. Bus 39 represents address lines A01–A23 in the schematics. Bus 55 represents address lines PA0–PA19 plus AS4–AS7. Bus 41 represents address lines PA0–PA19, and bus 57 represents lines DB0–DB7.

Figure 2:
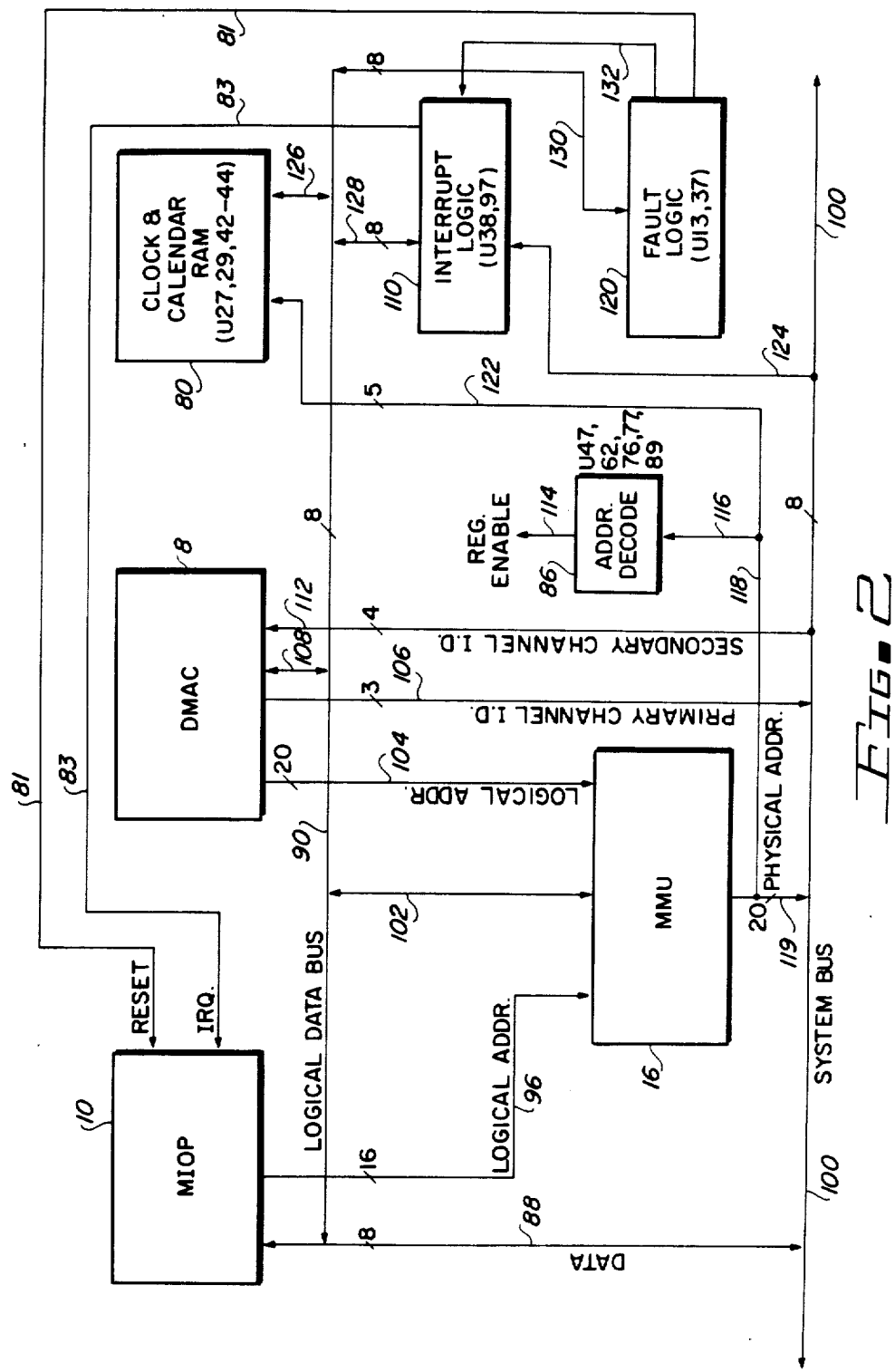
FIG. 2 shows a block diagram illustrating a portion of the data processing system shown in FIG. 1, namely the Master Input/Output Processor board, comprising the direct memory access controller (DMAC) 8, master input/output processor (MIOP) 10, and memory management unit (MMU) 16.

FIG. 2 shows a block diagram illustrating a portion of the data processing system shown in FIG. 1, namely the Master Input/Output Processor board, comprising the direct memory access controller (DMAC) 8, master input/output processor (MIOP) 10, and memory management unit (MMU) 16.

MIOP 10 is coupled via data bus 88 to system bus 100 and reset input over line 81 and an interrupt request input over line 83.

DMAC 8 is coupled via bus 104 to the MMU 16 and via 3-bit primary channel i.d. bus 106 to the system bus 100. DMAC 8 is also coupled via bus 108 to local data bus 90 and via 4-bit secondary channel i.d. bus 112 to system bus 100. The local data bus 90 is also coupled to data bus 88.

The clock and calendar RAM 80 is coupled via bus 122 to address bus 118 and via bus 126 to local data bus 90. Clock and calendar RAM 80 comprises units U27, 29, 43, and 44 in the detailed schematic diagram.

The real time clock is implemented with an MC146818. U42 and 43 buffer the address and data bus for multiplexing to the MC146818. PAL U27 generates the necessary control signals for interfacing to the MC146818. The U29 switch is used to isolate signals from the MC146818 when there is no power applied to the system. The battery is sized to maintain clock operation for approximately two weeks.

The MIOP is a Motorola MC68B09E and is designated U67 on the schematic. PAL U49 and register U50 control the clocks to the MIOP logic. Most of the logic on the MIOP board is synchronized to the 8 MHZ clock. There are four other clocks in the system which supply information as to the state of either a processor cycle or a DMA cycle. PAL U49 and register U50 generate clocks E, Ec, Q, and Qc. The E and Q clocks are the clocks which the MC68B09E require. These clocks are halted during DMA (see FIG. 7). To maintain bus timing which is similar to the processor's during DMA, two other clocks are impelemented. Ec and Qc are continuous running clocks. They are in phase with E and Q when the MIOP is executing.

Pins 12 and 19 of U49 generate the E and Q signals advanced by one clock. U50 then delays these signals by one 8 MHz tick to create the actual processor clock.

Pin 13 of U49 generates the refresh grant signal to the bus interface. This is active whenever U49 detects a non AVMA signal from the MIOP, at the beginning of DMA sequence, or upon request from the 8-bit memory.

Pin 14 is the hold Q signal to the DMA sequence logic. It flags the DMA logic that the processor clocks have stopped to permit a DMA sequence. The hold signal is set upon request from the DMA logic and remains set until it detects a DMA sequence count of C.

Pin 15 generates the VME signal to the bus interface. VME is a sixteen-bit bus which is implemented as the interface between the CPU and the 16-bit memory 2, 4, 6. In this context, the VME signal defines the target memory board for the current DMA cycle as the 16-bit memory 2, 4, 6.

Pin 16 generates the continuous Q clock.

Pin 17 generates the continuous E clock.

Pin 18 is an internal flag to U49 to define valid processor bus cycles.

Interrupt logic 110 is coupled via bus 128 to local data bus 90, via bus 124 to system bus 100, and via bus 132 to fault logic 120. Interrupt logic comprises units U38 and 97 on the detailed schematics.

Fault logic 120 is coupled via bus 130 to local data bus 90 and via bus 81 to the MIOP 10. Fault logic 120 comprises units U13 and 37 on the detailed schematics.

The MIOP fault logic can be described as a three-state diagram. The fualt logic enters state one when the system reset is activated. This is during power up or when the reset button is pushed. While in state one, fault detection is inhibited, and the fault read register is set to all ones.

The fault logic enters state two when the physical location of F7811 is examined by the MIOP. The fault logic stays in state two until a fault is detected. The content of the fault read register is a 7F while in state two.

The fault logic enters state three when a fault is detected. The fault register can be examined to determine the case of the fault. Examining the fault register at location F7811 will re-enable faults putting the fault logic in state two. Examining the fault register at F7814 leaves the fault logic in state three.

If a fault occurs which is caused by direct code execution of the MIOP, the MIOP and MMU fuse register will be reset. This guarantees that the MIOP will have control of the system and that the MMU will be in the Absolute state. If the fault occurs due to DMA activity, the DMAC will be inhibited on all channels, and a level zero interrupt will be generated to the MIOP.

The following is a definition of the fault register. The active sense of the fault register when examined by the MIOP is a zero.

Bit 0 is the page fault indicator. A reference to the physical page in RAM at location F7000 sets this indicator.

Bit 1 is the write protect fault. The write protect fault is generated by the most significant bit of the MMU translation RAM. Write protect is inhibited when the MMU is in the Absolute state, System state, and during DMA transfers.

Bit 2 is the watch dog timer fault. The watch dog timer monitors the real time clock interrupts. If an RTC interrupt is not cleared within 128 RTC interrupt intervals, a fault is generated.

Bit 3 indicates an MMU parity fault.

Bit 4 indicates a main memory parity fault. A read only four-bit register, associated with the 8-bit memory can be examined to determine which bank of RAM's caused the error. Reading that register also clears the fault indicator which is on the memory board.

Bit 5 is a DMA cycle indicator. It indicates whether a fault was a function of a DMA cycle or a processor execution.

Bit 6 indicates that the CPU generated a fault due to a DMA transfer.

Bit 7 is the fault state indicator. If bit 7 is at zero, the fault logic is enabled.

Address decoder 86 is coupled via bus 116 to address bus 118. Address decoder 86 generates a register enable signal over line 114. Address decoder 86 comprises units U47, 62, 76, 77, and 89 on the detailed schematics.

MMU 16 is coupled via bus 102 to the local data bus 90, via 20-bit bus 104 to the DMAC 8, and via 20-bit bus 119 to the system bus 100.

The MIOP 10 serves as the central I/O channel to the 16-bit subsystem. The MIOP 10 processor off-loads CPU 5 with certain low level functions related to I/O and controls all I/O data movements.

The MIOP interrupt logic is implemented with register U38 and gate U97. Eight discrete interrupt signals are synchronized by register U38. The presence of any of these interrupts is detected by gate U97. U97 generates an IRQ signal to the MIOP 10. When an interrupt occurs, the MIOP 10 can examine the contents of U38 to determine the source. The interrupt assignment is defined in the following table:

| Level | Source |
| --- | --- |
| 0 | Fault logic on MIOP |
| 1 | CIOP 3 |
| 2 | Real time clock and DMA complete |
| 3 | CIOP 1 |
| 4 | CIOP 2 |
| 5 | CPU |

-continued

| Level | Source |
|---|---|
| 6 | Not used |
| 7 | Coax |

Figure 3:
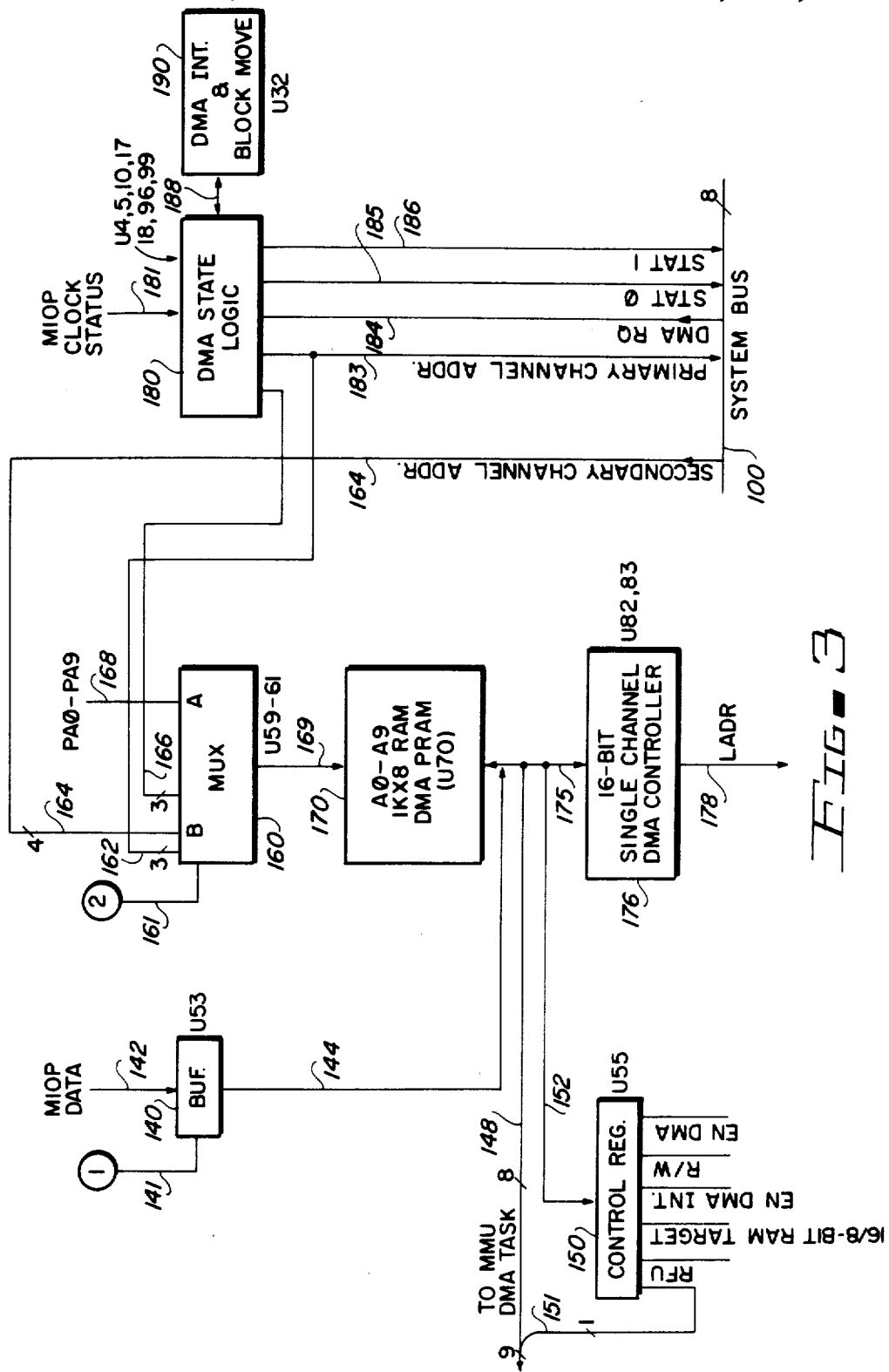
FIG. 3 shows a block diagram illustrating in greater detail a preferred embodiment of the Direct Memory Access Controller Supporting Multiple Input/Output Controllers and Memory of the present invention.

FIG. 3 shows a block diagram illustrating in greater detail a preferred embodiment of the DMAC 8 of the present invention. The DMAC 8 includes a 1K by 8 RAM and DMA PRAM 170 coupled via bus 169 to multiplexer 160, vis bus 144 to buffer 140, and vis bus 175 to the 16-bit single channel DMA controller 176. Block 170 comprises unit U70 in the detailed schematics.

Buffer 140, represented by unit U53 in the schematics, receives a timing signal "1" over line 141 and a MIOP data signal over bus 142.

Multiplexer 160, which comprises units U59–61 in the schematics, receives a timing signal "2" over line 161. MUX 160 is coupled via bus 162 to bus 183, via bus 166 to the DMA state logic 180, via bus 164 to system bus 100, and receives PA0–PA9 inputs over address bus 168. The secondary channel addresses are carried over bus 164, represented by pins 49–52 on the "P2" edge connector in the schematics.

The DMA state logic, which comprises units UA, 5, 10, 17, 18, 96, and 99 in the schematics, receives an MIOP clock status signal over bus 181, and is coupled via bus 188 to the DMA interrupt and block move circuit 190, represented by unit U32 in the schematics. The DMA state logic 180 is also coupled via busses 183–186 to the 8-bit system bus 100. Bus 183 carries the primary channel addresses, represented by pins 35, 38, and 39 of the "P2" edge connector in the schematic diagram. Bus 184 carries the "DMA RQ" signal, represented by pin 34 of the "P2" edge connector. Busses 185 and 186 carry the "STAT0" and "STAT1" signals, respectively, represented by pins 28 and 29 of the "P2" edge connector.

A 16-bit single channel DMA controller 176, represented by units 82 and 83 in the schematics, is coupled via bus 175 to block 170 and generates LADR signals over bus 178.

An 8-bit bus 148 is coupled to bus 175. Coupled to bus 148 via line 151 is control register 150, represented by unit U55 in the schematics. Control register 150 is coupled to signals identified in FIG. 3 as "RFU", "16/8 bit RAM target", "EN DMA Int.", "R/W", and "EN DMA". The "RFU" signal corresponds to pin 2 of unit 55 (FIG. 10B); the "16/8 Bit RAM Target" signal corresponds to pin 6; the "EN DMA Int." signal corresponds to pin 15; the "R/W" signal corresponds to pin 16; and the "EN DMA" signal corresponds to pin 5.

DMAC 8 is initialized and maintained by the MIOP 10. DMAC 8 moves byte data between peripheral controllers and MIOP main storage 20 or CPU main store 2, 4, 6; between MIOP main storage and CPU main storage; and within MIOP main storage or CPU main storage.

The DMA channels are divided into 8 primary groups. A peripheral controller (or controllers) is assigned to a primary group. There are 16 DMA channels per primary group The peripheral controller responding to primary group number one has the highest priority. Number two is next, and number seven has the lowest priority. Normal DMA service is done in a sequential scan without regard to priority. When the priority line is enabled, the sequential scan is interrupted, and the peripheral controller aassigned to group one is scanned next.

There are eight one-byte registers per DMA channel. Therefore, there are 1024 program-visible registers for DMA control. The base physical address for the 1024 registers is F7400. The registers for primary group N1 start at address F7400+(N1×7F), where N1 ranges inclusively from zero to seven. Since each DMA channel has 8 registers associated with it, the address of the first register for DMA channel N2 in primary group N1 is F7400+(N1×7F)+(N2×8), where N2 ranges inclusively from 0 to F.

The eight registers associated with each DMA channel will now be defined. They are identified as registers zero through seven. Register 0 is the status and control register. Its control bits are defined as follows:

Bit 0 is the enable bit and must be set to a 1 to enable a DMA channel.

Bit 1 is the read/write bit. When bit 1 is set to a 1, the DMA transfer reads target memory. Setting the bit to a 0 writes into target memory.

Bit 2 is the DMA complete interrupt enable bit. Setting this bit to a 1 enables an interrupt when the byte count reaches zero or when the transfer address reaches XXFFFF. Since the DMA counters are 16 bits, software must adjust them when crossing a 64K boundary.

Bit 3 defines the target memory. When bit 3 is set to a 1 the 16-bit memory is the target of the DMA transfer. Setting bit 3 to a 0 specifies the MIOP's main memory (8 bit RAM) as the target RAM.

Bits 4 through 6 are not used.

Bit 7 is the 24th logical address bit when the 16 bit RAM is the target memory.

Register 0 contains the status of F8 when the DMA transfer is complete. Register 0 can be examined for completion status without restriction.

Register 1 contains bits 8 through 15 of the transfer address. The transfer address can also be considered the starting address when it is initialized.

Register 2 contains bits 0 through 7 of the transfer address. If registers 1 and 2 are examined during a DMA transfer, they will point to the location which is going to be accessed next. When the DMA transfer is complete, registers 1 and 2 point to the last location that was accessed.

Register 3 holds bits 8 through 15 of the byte count.

Register 4 holds bits 0 through 7 of the byte count. Registers 3 and 4 are loaded with the total number of bytes to be transferred. They have a zero value when the transfer is complete.

Register 5 holds bits 16 through 23 of the transfer address parameter. When the 8-bit RAM is the target memory, bits 0 through 8 of register 5 contain the task number which is presented to the MIOP MMU 16. When the 16-bit RAM is the target memory, bits 0 through 7 of register 5 contain the task number/address component which is presented to the MMU 12 on the 16-bit processor board.

Registers 6 and 7 are not used.

Referring again to FIG. 3, the DMAC has three data paths and a state machine which goes through a sequence of steps for each DMA transfer. A DMA transfer of 1 byte per bus ownership requires a state sequence of 17 steps. A sequence of 24 steps is required for a DMA transfer of 8 bytes per bus ownership.

The DMA parameters are stored in a fast 1024 byte RAM 170. The MIOP 10 can access this RAM via enable 1 over line 141 in FIG. 3. The data path buffer is U53, and the enable 1 signal is decoded from the physical address bus by U76. This data bus also connects to the MMU DMA task register, the DMA control register, and a 16-bit single channel DMA controller. The single channel DMAC is implemented by two LSI I.C.'s, U82 and U83. The DMA control register is U55, and the MMU DMA task register is U95.

The address to the static RAM 170 is multiplexed between the physical address bus 168 and the DMAC state logic 180. The multiplex select line is connected to the MIOP E clock so that the processor has access to the RAM during the positive cycle of the clock. The multiplexer logic is U59-61.

During the E-not portion of the clock, the static RAM 170 is addressed by the DMA control logic. This address has three components. The three most significant address bits are set equal to the bus signals which scan each primary group of DMA channels. The next four most significant address bits are defined by the peripheral controller which is assigned to the primary group of DMA channels. Therefore, the peripheral controller indexes into the static RAM to select the desired DMA channel. The three least significant address bits are controlled by the DMA sequence counter. This counter indexes into the group of eight registers which are associated with each DMA channel.

Figure 4:
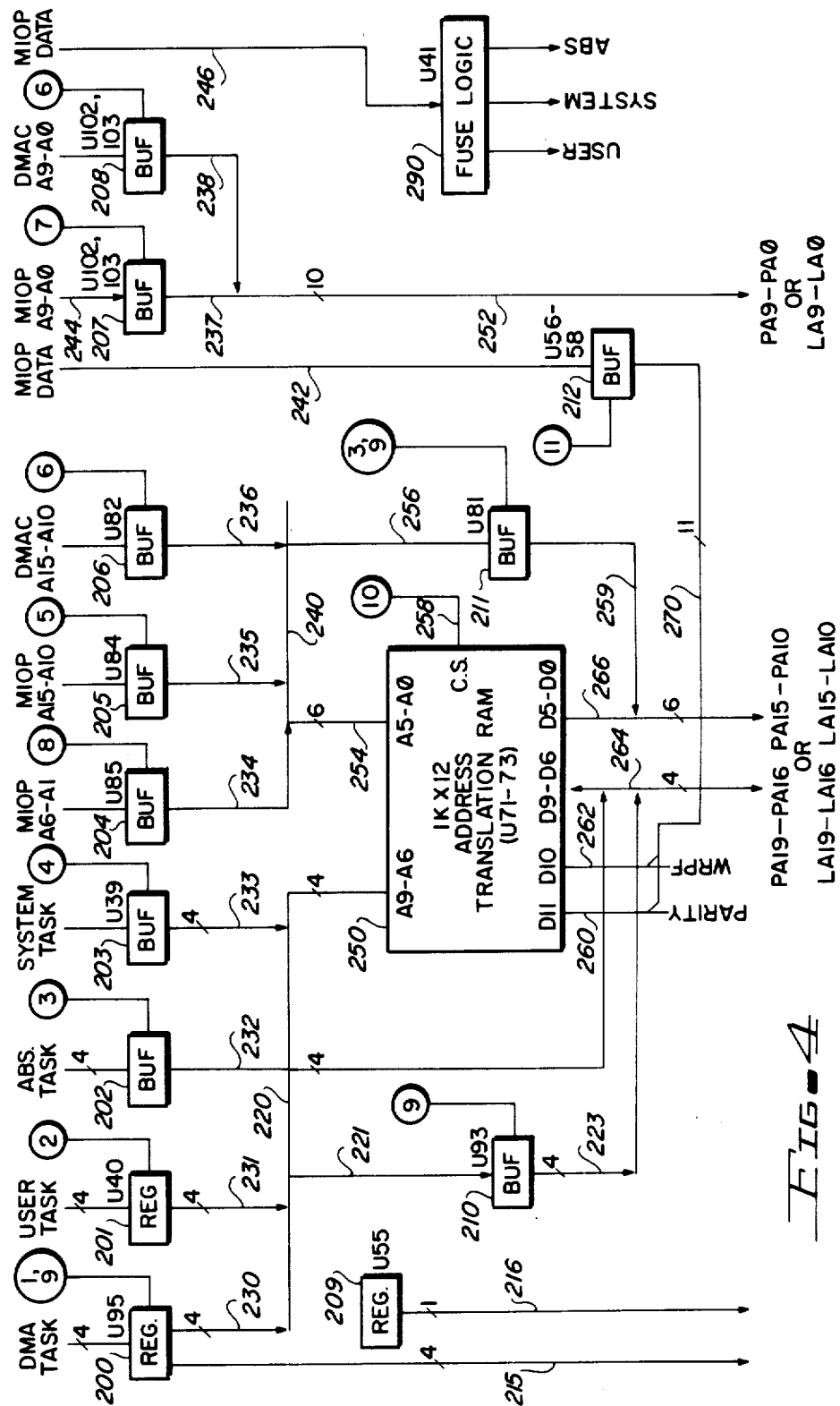
FIG. 4 shows a block diagram illustrating the MMU 16 of the data processing system shown in FIG. 1.

FIG. 4 shows a block diagram illustrating in greater detail the MMU 16 of the data processing system shown in FIG. 1. The MMU 16 includes a 1K by 12 address translation RAM 250, represented by units U71-73 in the schematics. Address translation RAM 250 is coupled to 4-bit address bus 220, to 6-bit address bus 240, to parity line 260, to WRPF line 262, to 4-bit address bus 264, to 6-bit address bus 266, and to CS line 258.

The MMU 16 circuitry also comprises register 200 (unit 95 in the schematics), responsive to the "1" and "9" timing signals and to the "DMA Task" signals, and coupled to busses 230 and 215. Register 201 (unit 40) is responsive to the "2" timing signal and the "User Task" signal, and is coupled to bus 231. Buffer 202 (unit) is responsive to timing signal "3" and the "Abs. Task" signal (which is always equal to hex value "F"), and is coupled to bus 232. Buffer 203 (U39) is responsive to timing signal "4" and the "System Task" signal (which is always equal to zero), and is coupled to bus 233. Busses 230-233 are all coupled to bus 220.

Buffer 204 (unit U85) is responsive to timing signal "8" and to the "MIOP A6-A1" signals, and is coupled to bus 234. Buffer 205 (unit U85) is responsive to timing signal "8" and the "MIOP A15-A10" signals, and is coupled to bus 235. Buffer 206 is responsive to timing signal "6" and to the "DMAC A15-A10" signals, and is coupled to bus 236. Busses 234-236 are coupled to bus 240.

Buffer 211 (U81) is responsive to bus 256 and to timing signals "3" and "9", and is coupled to bus 259. Buffer 212 (U56-58) is responsive to timing signal "11" and to the "MIOP Data" signals, and is coupled to bus 270. Buffer 207 (U102,103) is responsive to timing signal "7" and to the "MIOP A9-A0" signals, and is coupled to bus 237. Buffer 208 (U102, 103) is responsive to timing signal "6" and to the "DMAC A9-A0" signals, and is coupled to bus 238.

Over bus 252, which is coupled to busses 237 and 238, are generated either signals set "PA9-PA0" or LA9--LA0". Over bus 264 are generated either signal sets "PA19-PA-16" or "LA19-LA16". Over bus 266 are generated either signal sets "PA15-A10" or "LA1-5-LA10". Signals "PA19-PA0" represent the physical address lines for the 8-bit I/O target memory 20, Signals "LA19-LA0" represent the logical address lines for the 16-bit CPU target memory 2-6, and are identical to the "LADR" signals appearing in FIG. 9A.

Fuse logic 290 (U41) is responsive to the "MIOP Data" signals over bus 246, and generates "User", "System", and "ABS" signals. The logical condition for "User" signal being high is that pins 12 and 13 of U41 must both be high. The condition for the "System" signal being high is that pin 13 of U41 must be low and the condition for the "ABS" signal being high is that pin 12 must be low. Register 209 (U55) is coupled to bus 216.

The primary function of MMU 16 is to extend the address space of the MIOP 10. The MMU also protects the address space of one task from modification by another task. Memory address space expansion is accomplished by applying the upper six logical address lines along with the contents of a four-bit task number to the address translation RAM 250. The RAM output consists of the upper ten physical address lines PA1-9-PA10 plus the PARITY bit and a write protect (WRPF) bit. The upper ten physical address lines select a 1K memory page, and the lower ten address lines index into the page to address the selected byte.

The translation RAM 250 is 1024 locations, and there are 64 registers per logical address space. I.e. the MIOP 10 can directly address 64K locations of main store memory. Therefore the MMU 16 can support 16 tasks concurrently.

FIG. 4 illustrates that the MMU 16 is basically a static RAM with a number of data paths to the RAM address and RAM data In/Out. Each data path enable will now be described. The description includes when the enable is active, brief reasoning for the need of the function, and the location on the detailed schematic where the logic is found.

Enable 1—The active state is during DMA transfers to or from the 8 bit RAM 20. The DMA task number selects a set of 64 MAP registers in the translation RAM 250. Enable 1 is a function of the DMA strobe logic. The DMA task register is U95. The multiplexer for the DMA task number is U39.

Enable 2—The active state is during the execution of user software. The user task number selects a set of 64 MAP registers in the translation RAM. Enable 2 is a function of the MMU PAL. The user task register is U40, and the MMU PAL is U41.

Enable 3—Enable 3 is active when the MMU is in the Absolute state. PA19 through PA16 are tri-stated on the system bus. The bus-terminating resistors pull the lines high, so that the physical address is always in the range FXXXX. Enable 3 is a function of the MMU PAL. PA19 through PA16 bus buffer is U100.

Enable 4—Enable 4 is active when the operating system is executing in task 0 address space. The task number is set to 0 via the multiplexer and not the task register. Enable 4 is a function of the MMU PAL. The multiplexer which forces the task number to zero is U39.

Enable 5—Enable 5 is active during MIOP execution except during READ/WRITE cycles to/from the translation RAM. Enable 5 is implemented with the tri-state control feature of the MIOP and the MMU chip select. The TSC flip-flop is U17.

Enable 6—Enable 6 is active during DMA transfers. Enable 6 is active during memory cycles which are controlled by the DMAC. The DMA strobe flip-flop is U17.

Enable 7—Enable 7 is active during all MIOP execution cycles. Enable 7 is implemented with the tri-state control feature of the MIOP. The TSC flip-flop is U17.

Enable 8—Enable 8 is active during read or write cycles involving the translation RAM. Enable 8 is decoded from the physical address bus. Addresses FFF00 through FFF7F generate an enable 8. MMU chip select is driven at U11.

Enable 9—Enable 9 is active during DMA transfers where the 16 bit RAM 2, 4, 6 is the target memory. Enable 9 routes the lower 4 bits of the DMA task number around the translation RAM. That is, addresses are not translated by the 6 bit MMU if the address generated by the DMAC is selecting the 16 bit RAM. Buffer U93 bypasses the translation RAM with the 4 lower DMA task number bits. The U95 register is always enabled and drives the DMA task number bits 4 through 7. U55 drives the ninth DMA task number. This bit is controlled by bit 7 of the DMA status/control register 150.

Enable 10—Enable 10 is active for address translations which access the 8 bit RAM 20. Enable 10 is active for all operations except MMU Absolute state; DMA where the 16-bit RAM 2, 4, 6 is the target memory; read/write to the translation RAM; and an MIOP vector fetch. Translation RAM chip select is generated by MMU PAL U41 and gate U33.

Enable 11—Enable 11 is active when the MIOP reads from or writes to the translation RAM. Enable 11 controls a bi-directional buffer which monitors or drives the translation RAM's data port. When the translation RAM is accessed, its physical address is latched, so that the RAM contents do not de-select the RAM. A write to the translation RAM is a two-byte move. The high nibble of the RAM is stored in a latch. The MIOP then presents the low byte. Then all 12 bits are written to the RAM. This allows parity generation across 12 bits. A STX to the translation RAM writes the 12 bits to RAM with proper parity. The data buffers to the translation RAM are U56–U58.

Figures 5, 8A, 8B, 8C, 8D:
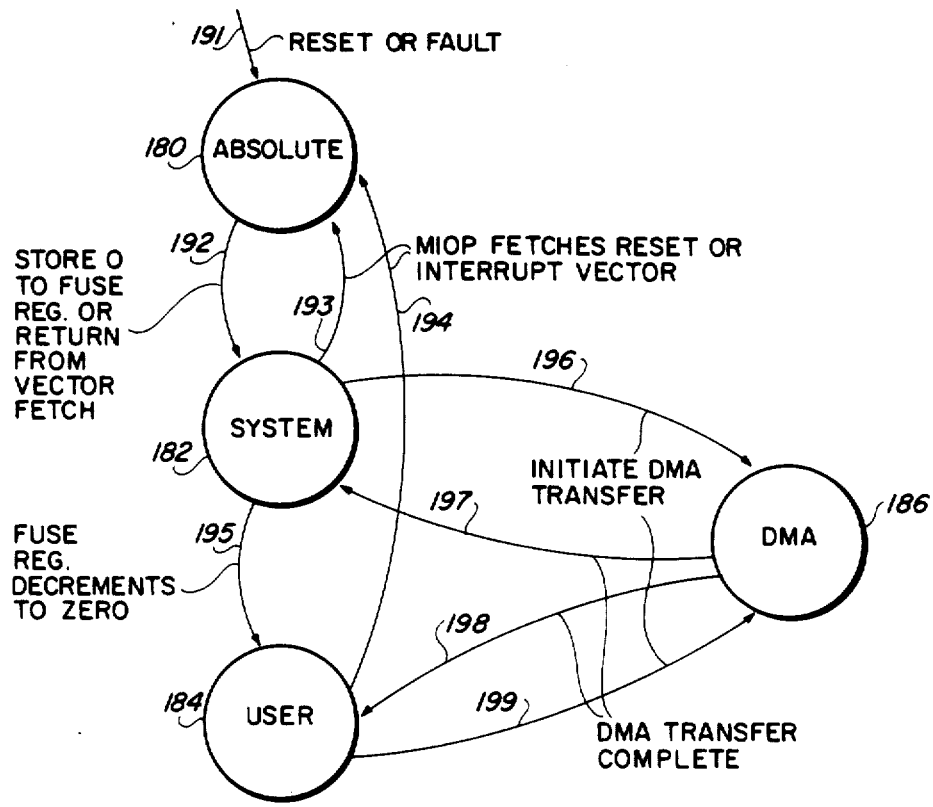
FIG. 5 shows the state diagram for the MMU 16 of the data processing system shown in FIG. 1.
FIG. 8A represents the keyplan for FIGS. 9A–9E.
FIG. 8B represents the keyplan for FIGS. 10A–10F.
FIG. 8C represents the keyplan for FIGS. 11A–11F.
FIG. 8D represents the keyplan for FIGS. 12A–12E.

FIG. 5 shows the state diagram for the MMU 16 of the data processing system shown in FIG. 1.

The look-up memory of MMU 16 translates addresses as a function of four MMU states. The states are Absolute, System, DMA and User. The transition between states is controlled by the MMU register, interrupt processing, initialization, and DMA cycles.

In the Absolute state, only the upper 64K of the physical address space can be accessed. This is accomplished by forcing physical address lines PA16 through PA19 to the true state and enabling the MIOP address bus directly to the system bus. The MMU 16 enters the Absolute state after the MIOP has been reset or when a 7 is written to the fuse register 290. The MMU temporarily enters the Absolute state when interrupt vectors are fetched. After the interrupt vectors are fetched, the MMU goes to the System state. The MMU changes from the Absolute to System state under program control when a 0 is written to the fuse register 290.

The System state forces the task number to zero. Therefore, when in the System state the MAP RAM 250 translates addresses based upon the contents of one of the first 64 locations.

The MMU changes from System state to User state under central of the fuse register 290. The fuse register is not accessible from the User state.

The contents of the task register define which set of registers in the translation RAM 250 are used to define the physical address. The task register range is from zero through 15.

The DMAC 8 supplies the task number for the DMA cycle. This is defined as the DMA state. After the DMA transfer, the MMU 16 returns to its previous state.

The translation RAM 250 can be acessed from the Absolute state, and the System or User state providing the RAM's address is mapped into the translation RAM. The translation RAM takes 128 bytes of address space from FFF00 through FFF7F. Since the translation RAM is 1024 locations by 12 bits, an additional addressing mechanism is required. The ten address lines required to access the RAM are formed by concatenating the contents of the task register with A1 through A6 from the MIOP. A0 from the MIOP selects the upper 4 bits of the RAM location or the lower 8 bits. To allow parity generation across 12 bits, the following restriction must be observed. Two bytes must be moved to the RAM with the high byte (A0=1) first. A STX to the translation RAM generates correct parity.

The MMU fuse register 290 is a three-bit down counter. The counter is used to effect the transition from Absolute to System state and System to User state. Writing a value between 0 and 7 causes the counter to decrement every tick of the processor clock. When the counter reaches zero, the MMU 16 switches to the User state. Writing a zero or a seven to the fuse register 290 is a special case. Writing a zero effects a transition to the System state immediately. Writing a seven causes an immediate transition to the Absolute state. The fuse register cannot be accessed from the User state.

Program execution in the user address space is initiated by storing to the fuse register. A write to the fuse register causes an internal three-bit counter to be loaded with the data. On each successive valid (non DMA) processor cycle the internal counter is decremented. When the counter reaches zero, the task number in the task register will be the active task. The number stored to the fuse register is the number of cycles left for execution in the System state. It is the responsibility of the operating system (task 0) to make sure the processor will execute from the new task properly by changing the program counter the same cycle that the fuse register reaches zero. The following is an example where the operating system jumps directly into the user space at location "start".

```
            Lda #n
            Sta tskreg
            Lda #4
            Sta fuse
            jmp start
```

| Fuse register contents | MIOP Operation |
|---|---|
| 0 | store 4 to fuse register |
| 4 | fetch jmp op code |
| 3 | fetch address high byte |
| 2 | fetch address low byte |
| 1 | non VMA cycle |
| 0 | fetch op code in task N |

A second example is storing a one to the fuse register followed by an RTI. This causes a context switch where the state of the processor is pulled from the user address space. The software must insure that interrupts are inhibited just before the stack pointer is loaded with the address of the user's stack area.

Regarding returning from a user task to the operating system, when an interrupt occurs, the MMU switches first to the Absolute state for the vector fetch and then to the System state. At the time the interrupt vectors are fetched, all the user registers except the stack pointer have been saved in the user MAP. The first thing the operating system must do is save the interrupted task's stack pointer and load the system stack pointer.

Figure 6:
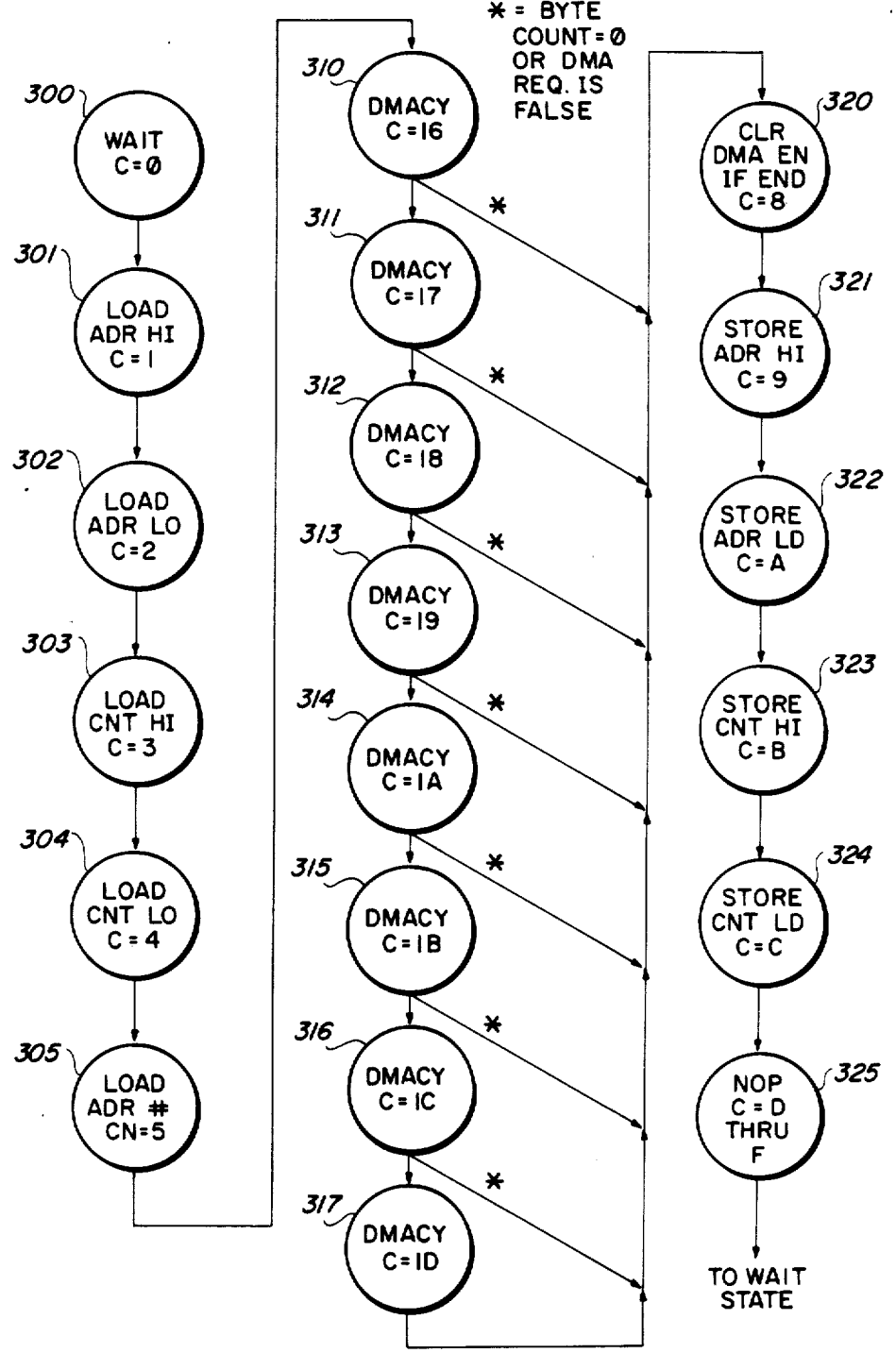
FIG. 6 shows the state diagram for the Direct Memory Access Controller Supporting Multiple Input/Output Controllers and Memory Units of the present invention.

FIG. 6 shows the state diagram for the DMAC 8 of the present invention. In FIG. 6 each bubble in columns 1 and 3 represents an 8 MHz clock cycle. Bubbles 300-305 represent the steps of loading the address high and low bytes and the counter high and low bytes, and bubbles 320-325 represent the inverse process, i.e. storing the address high and low bytes and the counter high and low bytes. In bubble 300 a one-bit control byte is loaded. In bubbles 301-305 8-bit bytes are loaded.

Bubbles 310-317 represent the actual DMA operation. The time taken for each bubble in column 2 depends upon the speed of the memory unit being addressed.

The DMAC sequence logic controls the movement of data between the static RAM 170 and the single channel DMAC. The sequence logic also generates the DMA strobe window. The strobe window can be from one to eight cycles long.

The DMA sequences is implemented with the U4 gate array and U18 counter. U4 controls the loading and incrementing of the state counter U18. Counter U18 is then decoded by U7, U5, and U4. U7 is an instruction decoder for the single channel DMA I.C.'s, U82 and U83. U7 also controls the read/write signal to the static RAM U70.

U5 decodes and controls various logic functions based upon the state count. Pin 12 decodes state 4. Pin 13 decodes state 5. Pin 14 controls the primary DMA channel scan counter U10. Pin 15 is an enable memory request signal. This signal must be valid before a memory request can be issued to the bus interface. Pin 16 is the request bus signal to the MIOP control logical. Pin 17 requests the system bus for DMA purposes. Pin 18 controls the loading of the DMA scan counter. This allows the interruption of the scan and forces it to a primary channel of 1. This is used for a priority DMA request. Pin 18 clears the DMA scan count to zero. This is required when DMA interrupts are queued into RAM. Pin 19 decodes the DMA sequence state of 12.

Since it is possible for DMAC 8 to generate interrupts faster than the CPU 5 can service them, an interrupts storage queue is used. The storage queue uses DMA channels zero and one. Channel zero is used to save the initial DMA parameters, while channel one actually stores the DMA channel number into main memory when a DMA interrupt occurs. U32 is the PAL which controls the interrupt queuing function, and latch U54 is used to hold the DMA channel member until it is stored into main memory. PAL U32 will be discussed further below, as it is also used for memory to memory DMA transfer.

When the byte count decrements to zero and interrupts have been enabled for that channel, the DMA scanner is immediately set to 0. U32 requests a DMA via U96-13. The DMA is executed by moving the contents of U54 to RAM. The storage queue is wrap-around, so that when the byte counter for DMA channel one reaches zero, the contents of DMA channel zero register are used for the next storage transfer to the interrupt queue. However when the contents of DMA channel zero are transferred from the static RAM to the single channel DMA controller U82 and 83, they are restored to the locations in static RAM which are associated with channel one. Therefore the interrupt queue has been wrapped around, and DMA channel 1 has been reinitialized.

DMAC 8 can access the two main memories in the system, namely the 8-bit RAM 20 which the MIOP executes from or the 16-bit RAM 2, 4, 6 which CPU 5 executes from. Channel 2 of DMAC 8 is dedicated to reading RAM for the memory to memory (mtm) function, and channel 3 is used to write to RAM for the mtm function. Therefore, DMA channels 2 and 3 can be initialized to transfer data between two buffer areas in either the 8 or 16 bit RAM's or between the two memories.

When the mtm function is used, four bytes of data are transferred under control of DMA channel 2 and moved to a four-byte FIFO. The four bytes stored in the FIFO are then moved to the destination RAM under control of DMA channel 3.

The four-byte FIFO is implemented with four discrete registers which are U51, U49, U63, and U66. The control logic for the mtm function is centered in PAL U32. The signals generated by U32 are discussed in the following paragraph.

Pin 12 controls the least significant address line to the DMA static RAM. This line is enabled during both DMA interrupts and the mtm function. Pin 13 is a request DMA signal. This signal is active for requesting a DMA cycle for storing the DMA channel number during DMA interrupts or for the mtm function. Pin 14 is a flag to internal logic to U32. It is set when there is a mtm move read request and not a write request from the FIFO. Pin 15 is a one tick delay for the DMA done signal. Pin 16 is the DMA done flag. This flag is set when a DMA transfer is complete.

Pin 17 is the wrap-around flag. It is set when DMA channel 1 decrements to zero. Pin 18 is another DMA done flag. It is a one-tick delay of the pin 16 flag. The setting of this flag is dependent upon the DMA completion interrupt bit in the control register of the active DMA channel. Pin 19 generates the write signal for transferring the DMA channel number to RAM for DMA completion interrupts.

Figure 7:
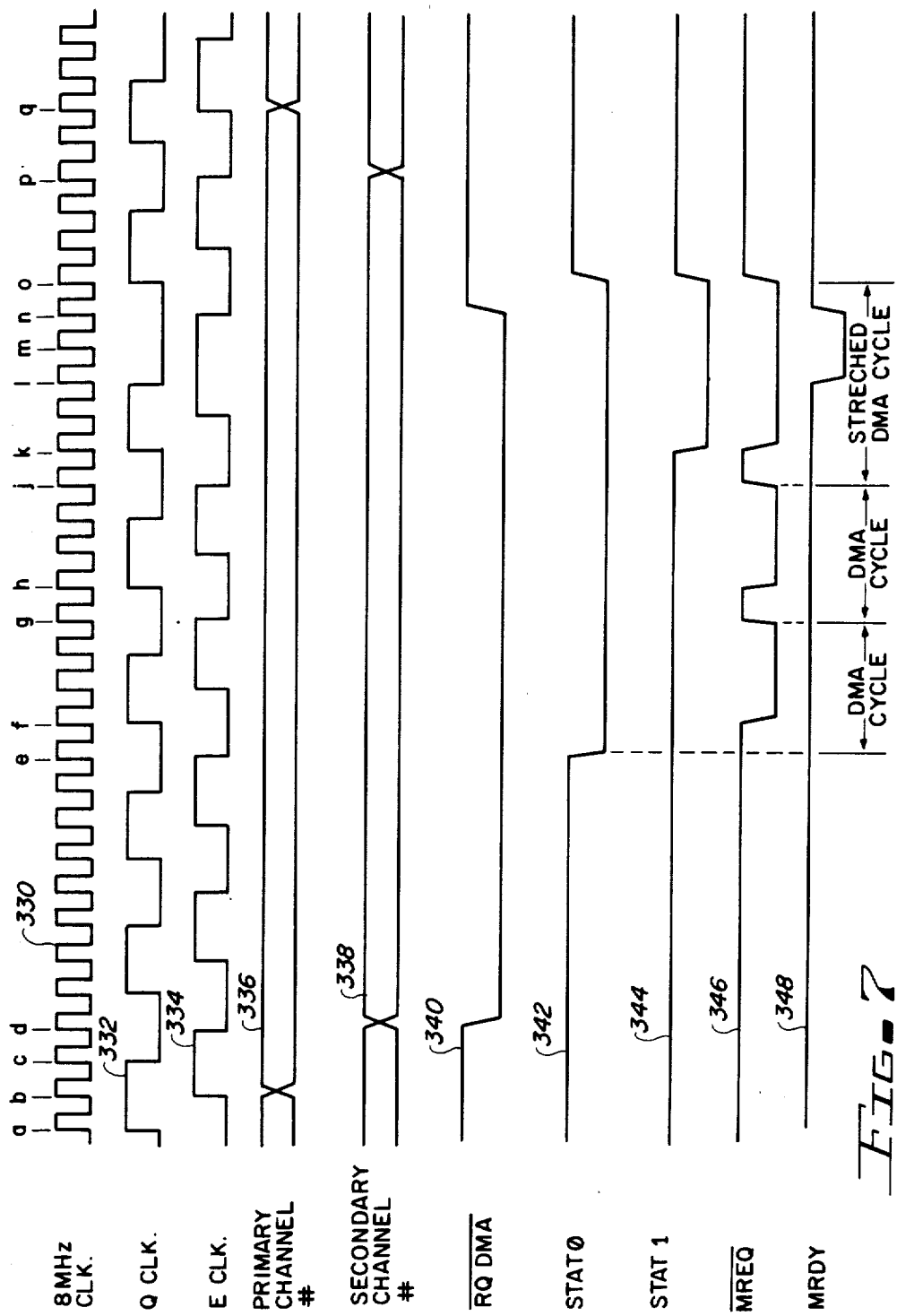
FIG. 7 shows a timing diagram illustrating a DMA operation as performed by the Direct Memory Access Controller Supporting Multiple Input/Output Controllers and Memory Units of the present invention.
Figure 9A:
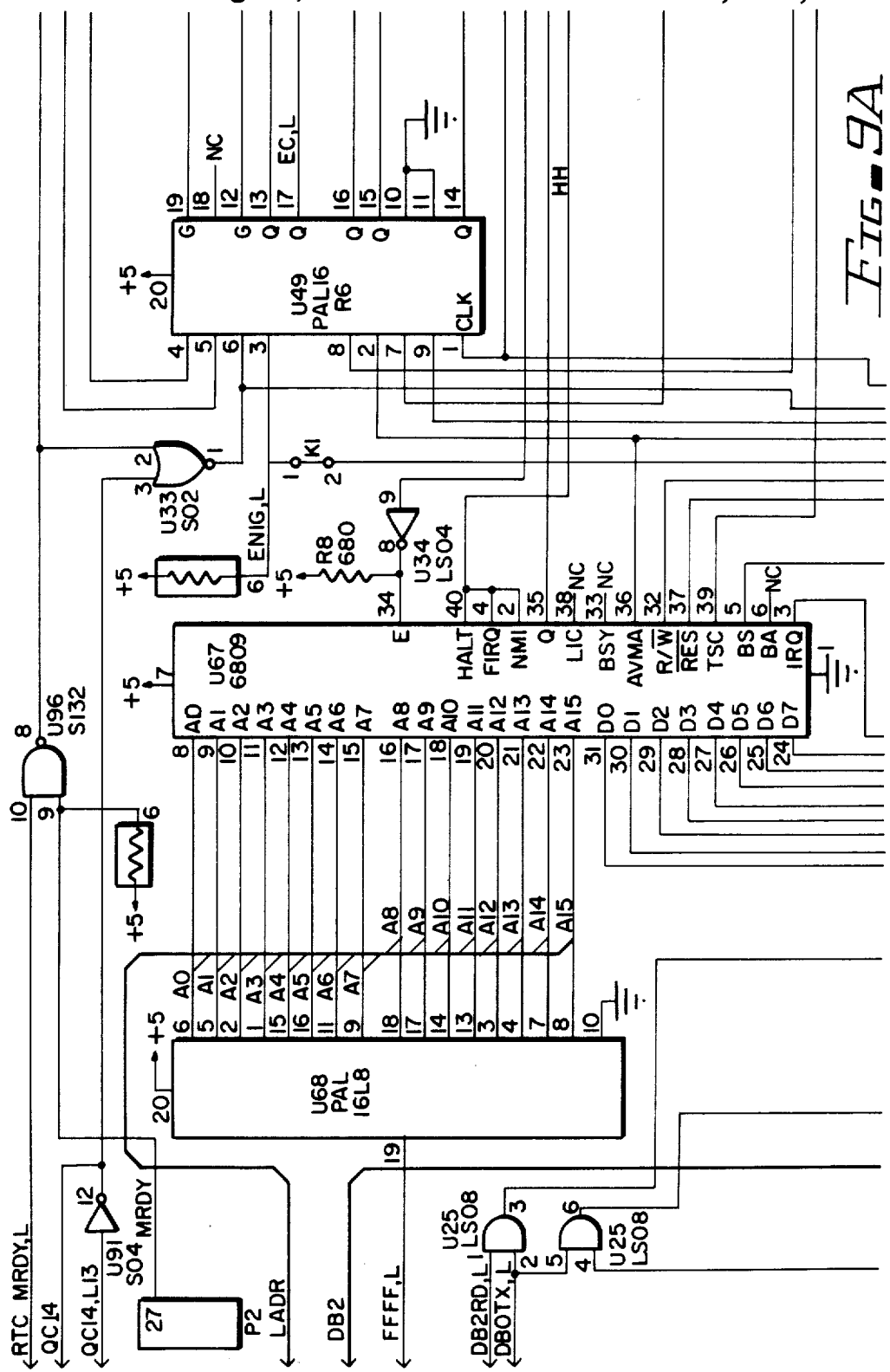
Figure 9D:
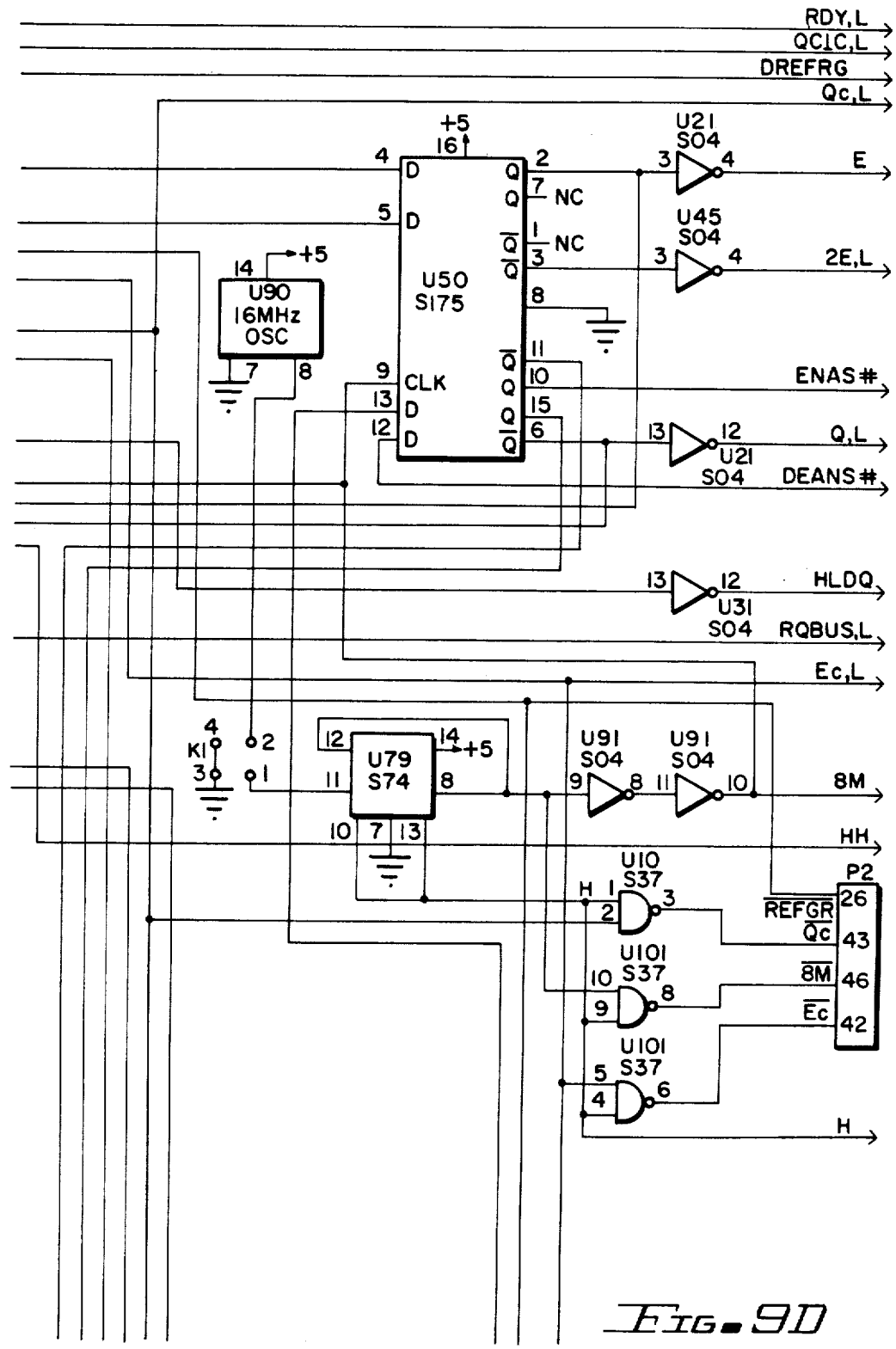
Figure 9E:
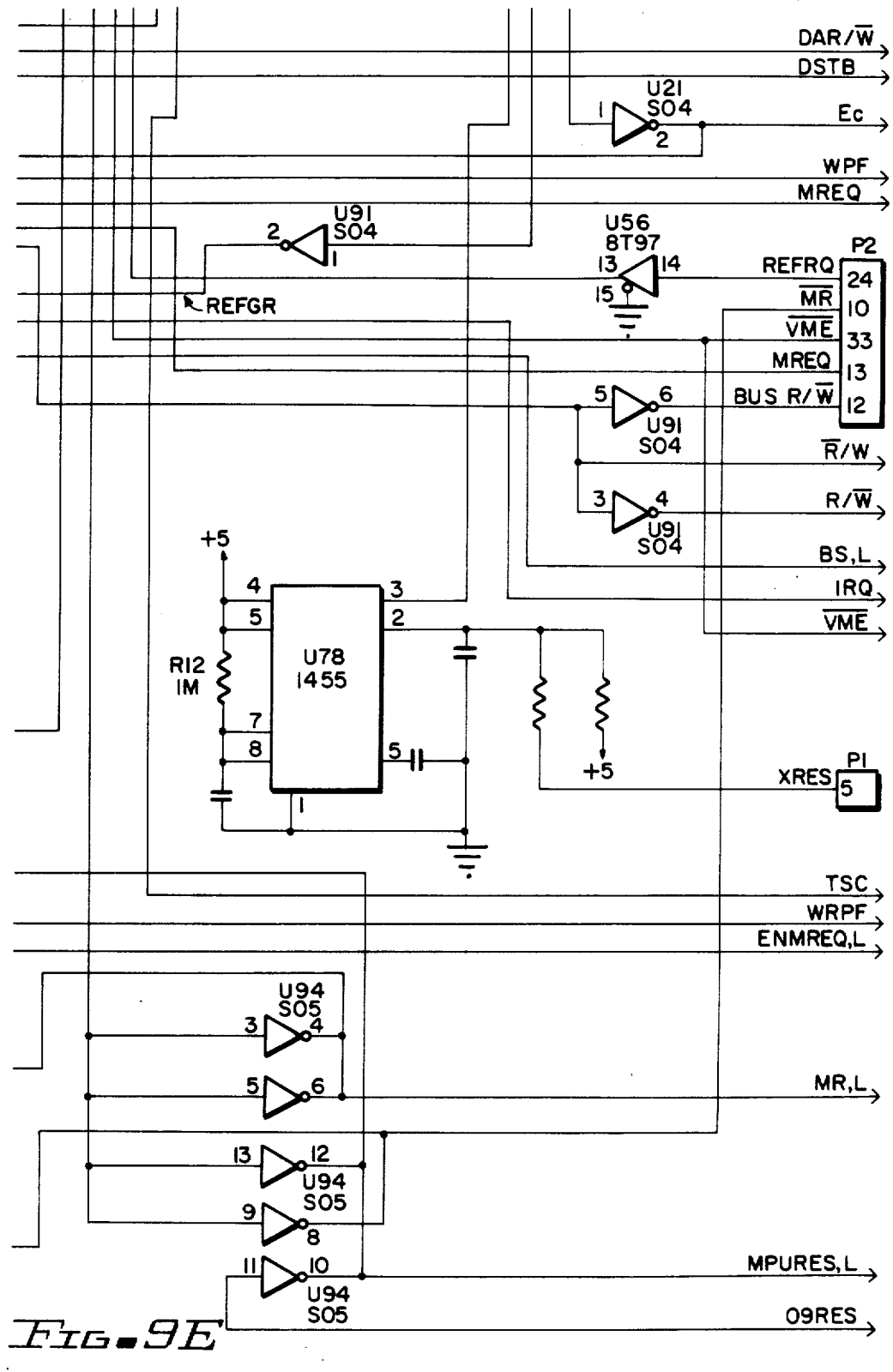
Figure 10A:
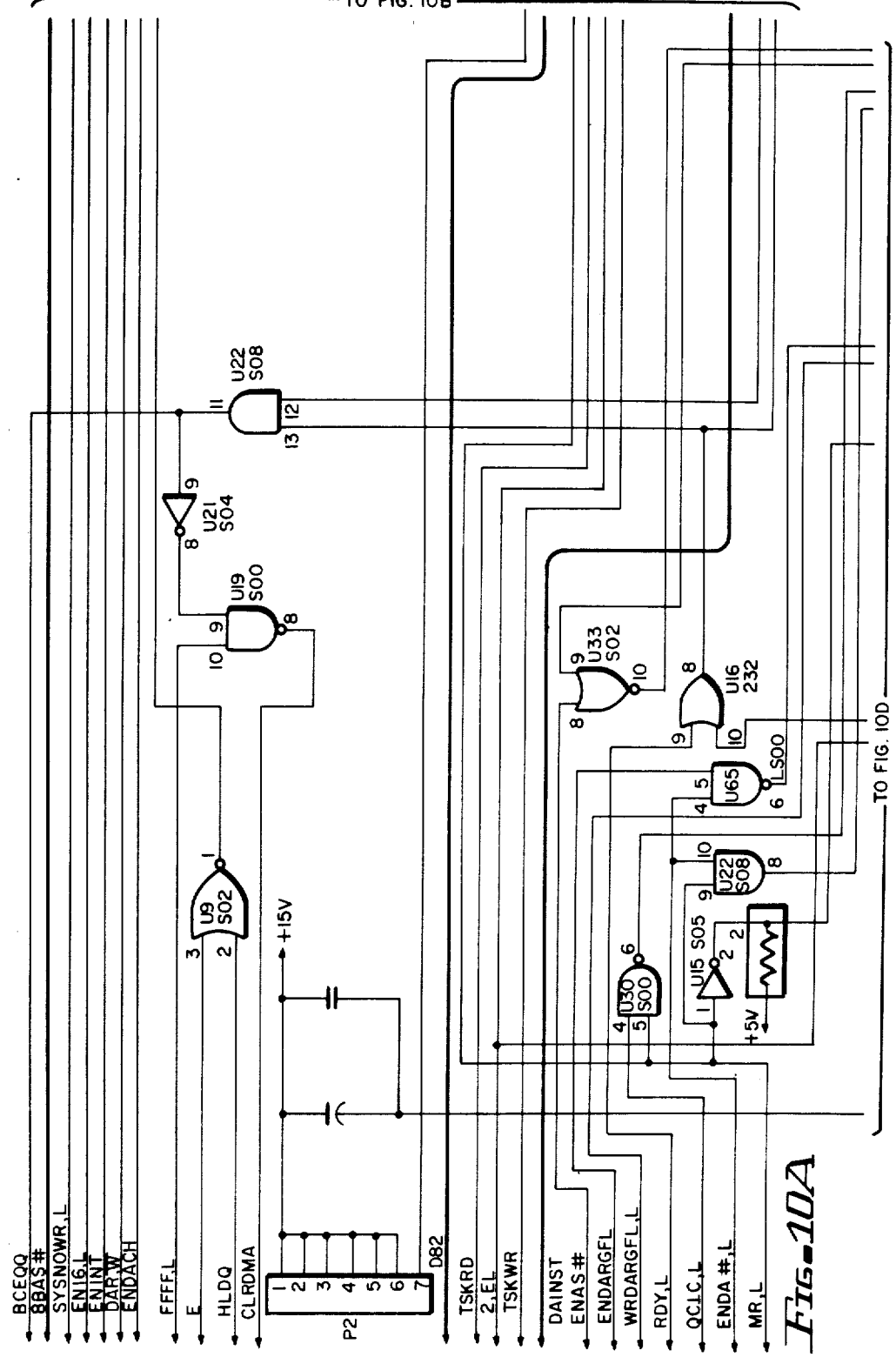
Figure 10E:
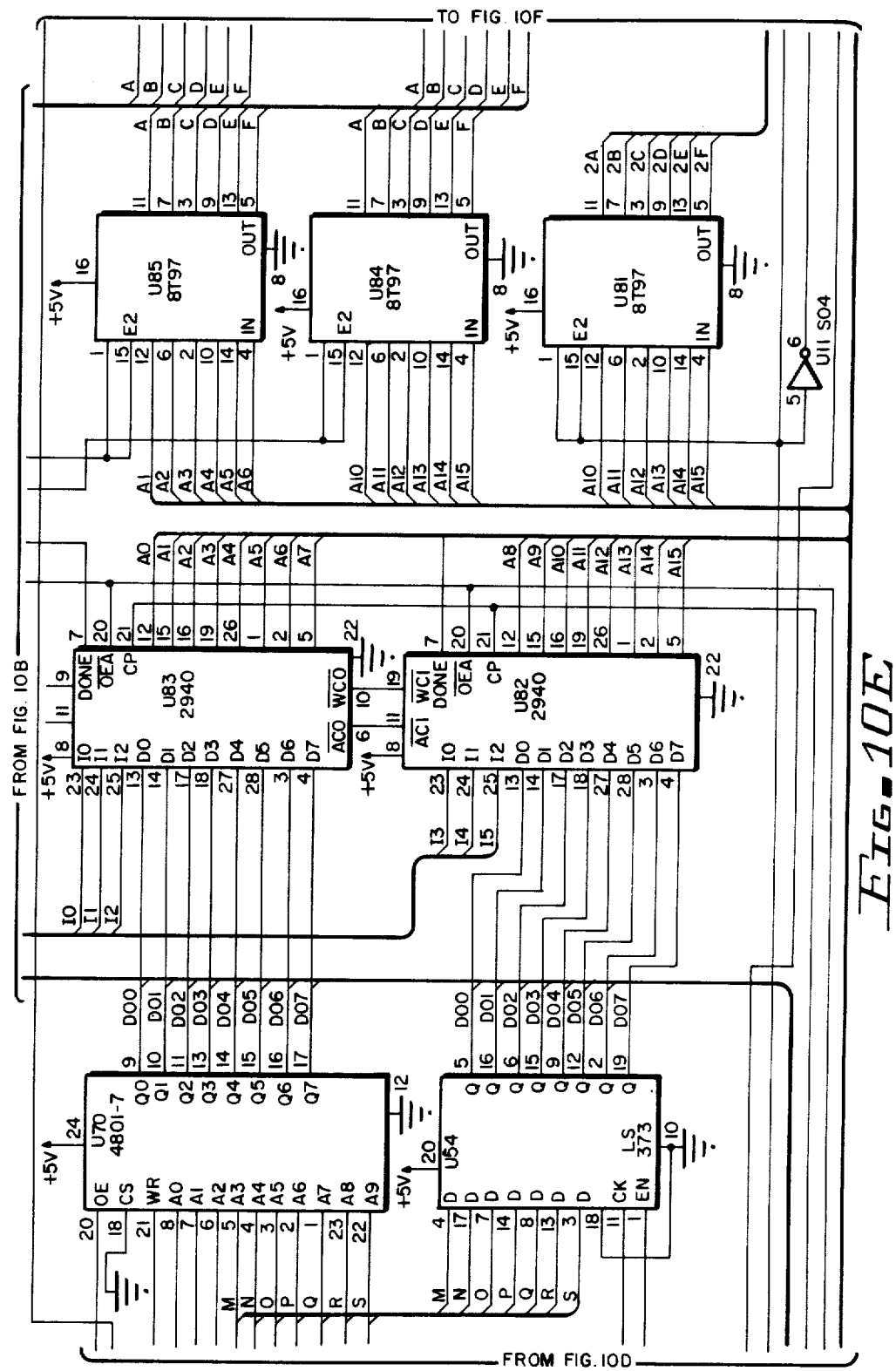
Figure 10F:
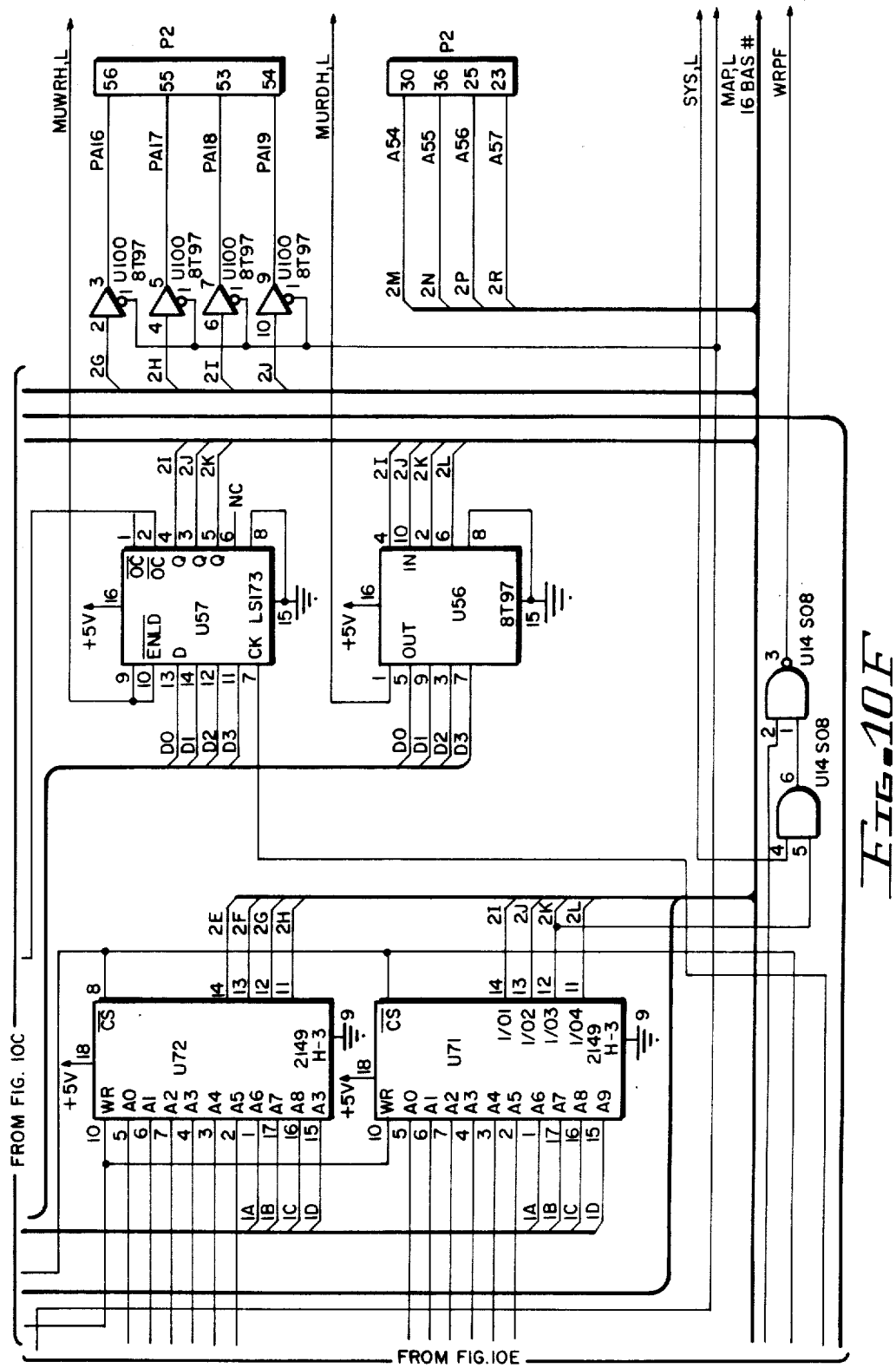
Figure 11D:
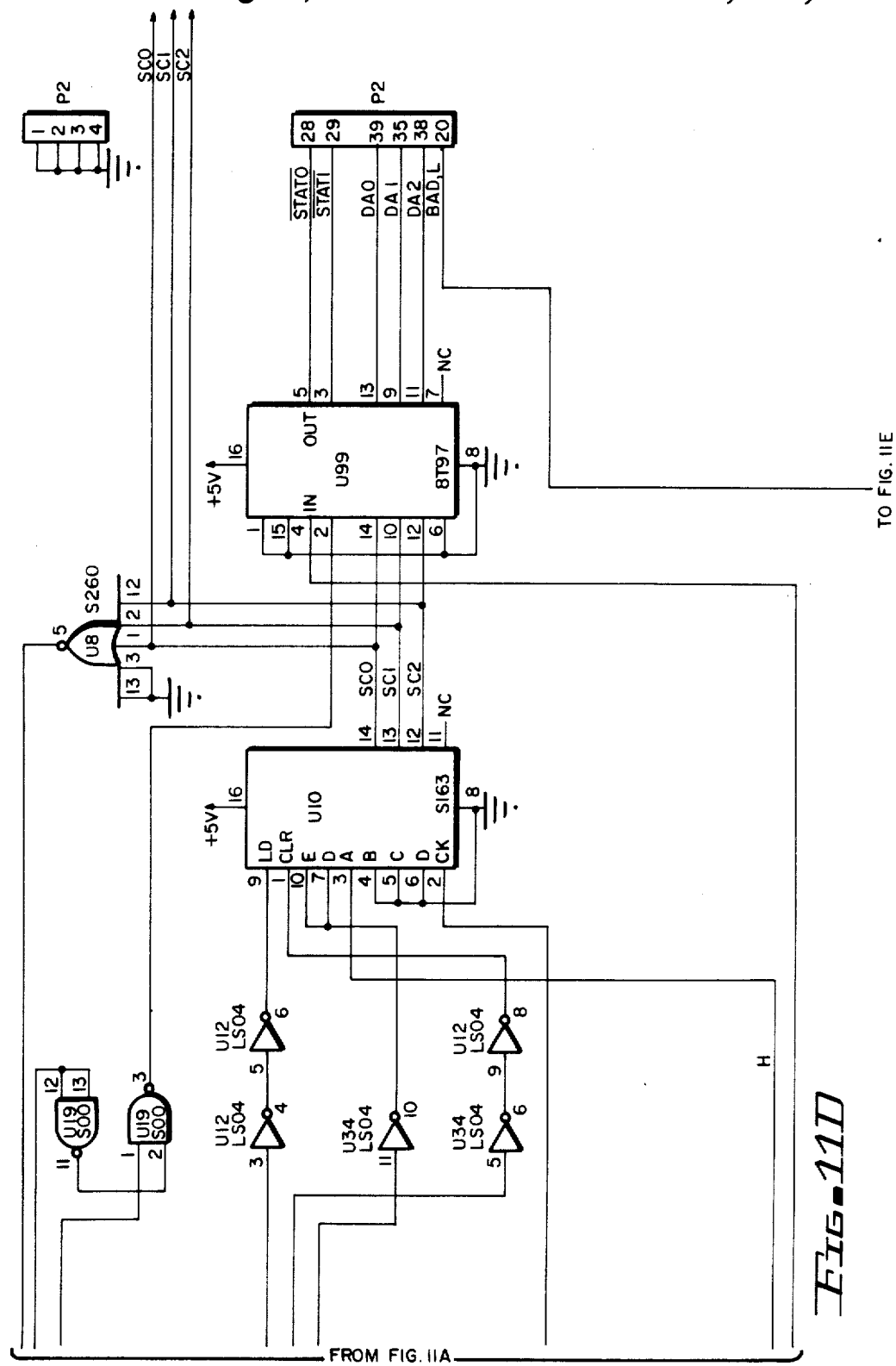
Figure 12A:
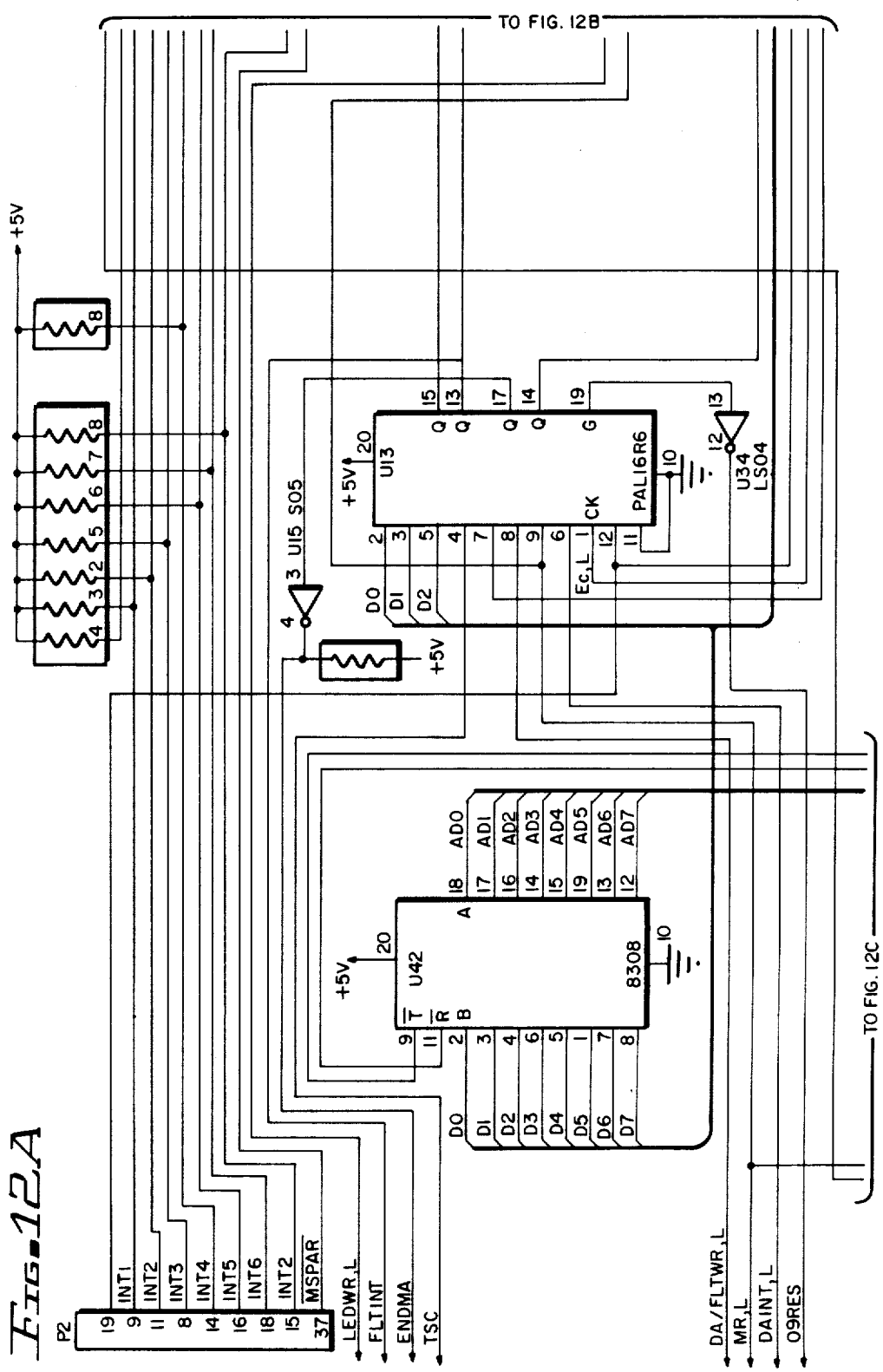
Figure 12D:
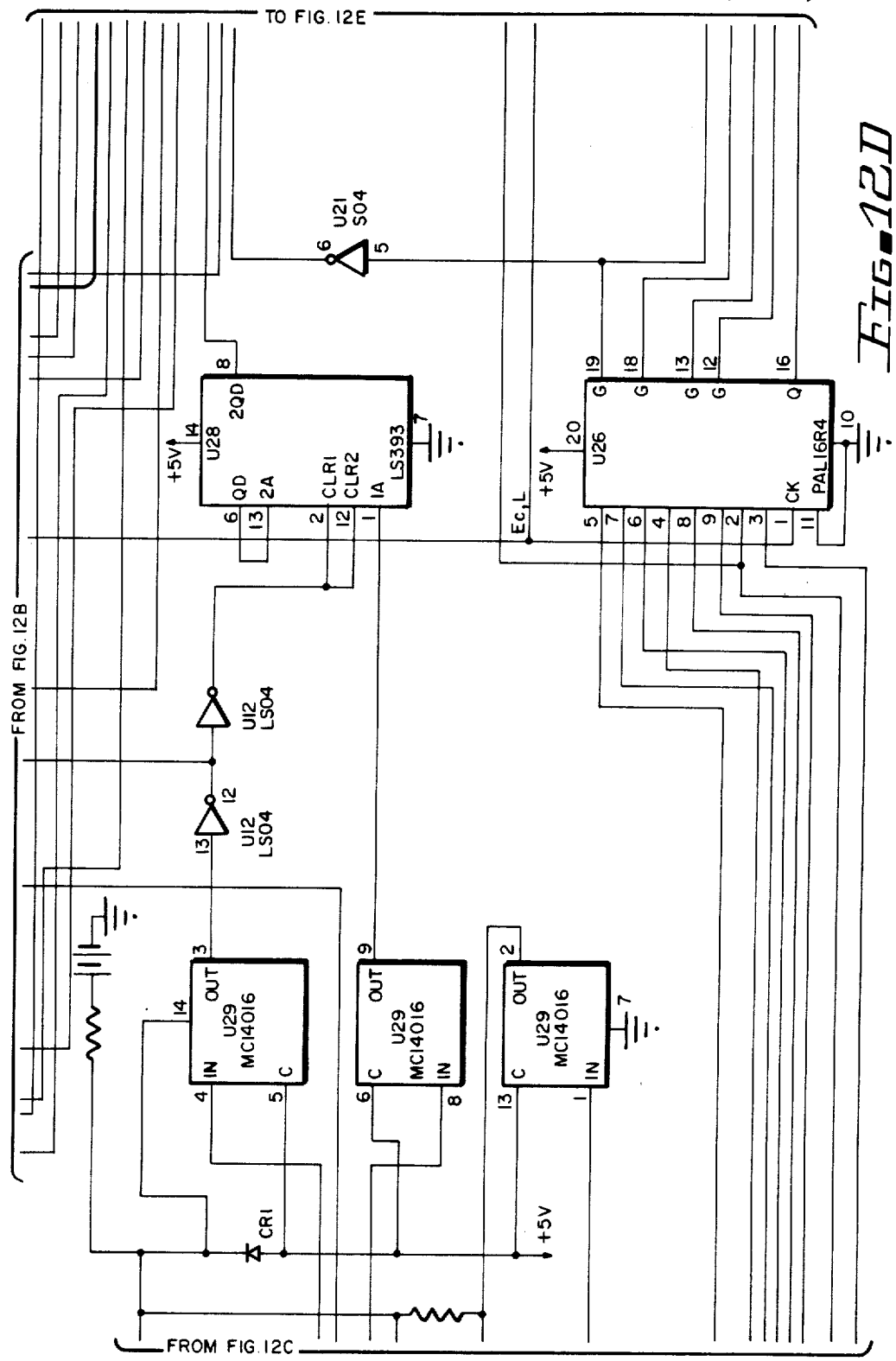

FIG. 7 shows a timing diagram illustrating a DMA operation as performed by the DMAC 8 of the present invention. Signal 330 represents the 8 MHz system clock. Signals 332 and 334 represent the "Q" clock and the "E" clock generated by the MIOP 10. Signal 336 represents the primary channel number, and is illustrated by pins 35, 38 and 39 of the "P2" edge connector shown in the schematics. Signal 338 represents the secondary channel number, and is illustrated by pins 49-52 of the "P2" connector. Signal 340 represents the inverted "RQDMA" signal, and is illustrated by pin 34 of the "P2" connector. Signals 342 and 344 represent the "STAT0" and "STAT1" signals, respectively, and are illustrated by pins 28 and 29, respectively, of the "P2" connector. Signal 346 represents the inverted "MREQ" signal, and is illustrated by pin 13 of the "P2" connector. Signal 348 represents the "MRDY" signal, and is illustrated by pin 27 of the "P2" connector.

FIG. 7 is a timing diagram of a three-cycle DMA sequence. The primary channel number is driven by the MIOP and is changed on the positive edge of 5. The peripheral responds with request and a secondary channel number on the next negative edge of 5. There are two E cycles of latency between requesting a DMA cycle and the DMA strobe. One cycle is required to effect an orderly stop of the processor clocks and the next is used to load the DMA parameters into the DMA counters. The DMA strobe is valid for the duration of the DMA burst. The memory request signal goes active 125 ns after the initiation of each DMA cycle and stays valid until the end of the cycle. It is the memory request signal that the target memories use to synchronize their logic to the actual data transfer.

Note that the last DMA cycle (i.e. between points "j" and "o") in the example has two special cases. The first is that it is the last DMA cycle to be executed until the DMA registers are re-initialized by the processor. The second point is that it is an extended DMA cycle. Processor or DMA cycles may be extended by negating the memory ready signal MRDY. This feature is used by the CPU 5 for synchronizing the 8-bit and 16 bit busses when a DMA cycle transfers data between them.

The DMA mechanism which is used to serve requests from peripheral devices also serves a request which is virtually a request by the DMA controller to itself. That is, the same DMA logic which stores data to the main memory via a peripheral request can also store the DMA channel number to main memory when the DMA control logic makes such a request.

FIGS. 9A-9E, 10A-10F, 11A-11F, and 12A-12E together form a detailed circuit schematic diagram of the Master Input/Output processor board, including the Direct Memory Access Controller Supporting Multiple Input/Output Controllers and Memory Units, of the data processing system shown in FIG. 1.

In FIGS. 9-12, much of the logic has been implemented in the form of commercially available integrated circuit components, the part numbers of which may be found in Appendix A. Other portions of the logic have been implemented by commercially available programmable array logic (PAL) elements available from Monolithic Memories and by commercially available field programmable logic arrays (FPLA), the programs for which may be found in Appendix B.

FIG. 13 shows a block diagram illustrating the flow of information between memories and peripherals through the DMAC of the present invention. Basically, the DMAC, shown here by reference numeral 350, functions as a cross-bar switch between two or more peripheral units, e.g. peripherals 371 and 372, and two or more memory units, e.g. memory units 361 and 362. Information can be transferred to either peripheral unit 371 and 372 from either memory unit 361 or 362, or vice versa. Also information can be tranferred between memory units 361 and 362.

It will be apparent to those skill in the art that the disclosed Direct Memory Access Controller Supporting Multiple Input/Output Controllers Memory Units may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a data processing system comprising a central processing unit, at least two memory units each storing instructions and data for processing by said central processing unit, and at least two input/output controllers each requiring access to each of said memory units, the improvement wherein said data processing system further comprises a direct access memory controller coupled between said input/output controllers and said memory units, said memeory controller enabling either input/output controller to access either of said memory units directly without generating a processor interrupt operation in said processing unit and without interrupting the operation of the other memory unit, and wherein said memory controller comprises multiplexer means coupled to said input/output controllers, said multiplexer means comprising means for coupling a first one of said input/output controllers to a first one of said memory units, and means for coupling a second one of said input/output controllers to a second one of said memory units in a time-division multiplexed manner.

* * * * *